(12) United States Patent
Lin et al.

(10) Patent No.: US 11,425,618 B2
(45) Date of Patent: Aug. 23, 2022

(54) COMMUNICATION SECURITY PROCESSING METHOD AND APPARATUS, AND SYSTEM

(71) Applicant: Huawei Technologies Co., Ltd., Shenzhen (CN)

(72) Inventors: Bo Lin, Beijing (CN); Jiangwei Ying, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/186,312

(22) Filed: Nov. 9, 2018

(65) Prior Publication Data

US 2019/0082367 A1  Mar. 14, 2019

Related U.S. Application Data

(63) Continuation of application No. PCT/CN2017/084002, filed on May 11, 2017.

(30) Foreign Application Priority Data

May 13, 2016  (CN) .......................... 201610319275.0

(51) Int. Cl.
*H04W 36/00* (2009.01)
*H04W 12/041* (2021.01)
(Continued)

(52) U.S. Cl.
CPC ......... *H04W 36/08* (2013.01); *H04W 12/041* (2021.01); *H04W 12/0433* (2021.01);
(Continued)

(58) Field of Classification Search
CPC . H04W 36/08; H04W 12/04; H04W 36/0038; H04W 36/38; H04W 12/0401;
(Continued)

(56) References Cited

U.S. PATENT DOCUMENTS 9,031,240 B2 * 5/2015 Yang ..................... H04L 63/068
380/278
9,788,358 B2 * 10/2017 Pelletier ................ H04W 16/32
(Continued)

FOREIGN PATENT DOCUMENTS

CN    101237381 A    8/2008
CN    102448060 A    5/2012
(Continued)

OTHER PUBLICATIONS

Translation of WO2015020449A1 (Year: 2015).*

*Primary Examiner* — Nishant Divecha
(74) *Attorney, Agent, or Firm* — Slater Matsil, LLP

(57) ABSTRACT

A method applied to processing of access stratum (AS) security for terminal handover from a source cell to a target cell, including obtaining a derivation parameter, deriving a target AS root key based on a source AS root key and derivation parameter, and calculating, based on the target AS root key, an AS security key used in the target cell. The source AS root key is an AS root key used in the source cell, the target AS root key is an AS root key used in the target cell, the derivation parameter is used to derive an AS root key and corresponds to a RAN node or a RAN node group or an area in which the target cell is located, and cells at a same RAN node, RAN node group, or area have a same derivation parameter.

4 Claims, 17 Drawing Sheets

(51) Int. Cl.
*H04W 12/0433* (2021.01)
*H04W 36/38* (2009.01)
*H04W 84/04* (2009.01)
*H04W 36/08* (2009.01)

(52) U.S. Cl.
CPC ....... *H04W 36/0038* (2013.01); *H04W 36/38* (2013.01); *H04W 84/042* (2013.01)

(58) Field of Classification Search
CPC ............... H04W 84/042; H04W 36/04; H04W 36/0061; H04W 36/0066; H04W 36/0079; H04W 36/14; H04L 2209/80; H04L 9/0816; H04L 9/0861; H04L 9/0891
See application file for complete search history.

(56) References Cited

U.S. PATENT DOCUMENTS

| | | | |
|---|---|---|---|
| 2010/0208692 A1* | 8/2010 | Kang | H04W 36/0055 370/331 |
| 2011/0086640 A1 | 4/2011 | Iwamura et al. | |
| 2011/0176510 A1 | 7/2011 | Hallenstal et al. | |
| 2012/0008776 A1* | 1/2012 | Ishida | H04W 12/04 380/247 |
| 2012/0039468 A1 | 2/2012 | Ishida et al. | |
| 2015/0126154 A1 | 5/2015 | Yang | |
| 2015/0222604 A1 | 8/2015 | Ylonen | |
| 2019/0174367 A1 | 6/2019 | Sharma | |

FOREIGN PATENT DOCUMENTS

| | | | |
|---|---|---|---|
| CN | 102740289 A | 10/2012 | |
| CN | 104125563 A | 10/2014 | |
| CN | 104937964 A | 9/2015 | |
| CN | 105557006 A | 5/2016 | |
| EP | 2582164 A1 | 4/2013 | |
| WO | 2010116621 A1 | 10/2010 | |
| WO | 2010119656 A1 | 10/2010 | |
| WO | 2014040245 A1 | 3/2014 | |
| WO | WO-2015020449 A1 * | 2/2015 | ........ H04W 12/0401 |
| WO | 2018166646 A1 | 9/2018 | |

* cited by examiner

COMMUNICATION SECURITY PROCESSING METHOD AND APPARATUS, AND SYSTEM

CROSS-REFERENCE TO RELATED APPLICATIONS

This application is a continuation of International Application No. PCT/CN2017/084002, filed on May 11, 2017, which claims priority to Chinese Patent Application No. 201610319275.0, filed on May 13, 2016. The disclosures of the aforementioned applications are hereby incorporated by reference in their entireties.

TECHNICAL FIELD

This application relates to the field of communications technologies, and in particular, to a communication security processing method and apparatus, and a system.

BACKGROUND

With development of wireless communications technologies, there are increasingly more users in a wireless network, and people pay more attention to security of wireless communication. Therefore, the wireless network provides a security mechanism to improve security of information transmission. A current security mechanism mainly includes aspects such as authentication, non-access stratum (NAS) security, and access stratum (AS) security. In the aspect of AS security, during each handover, a terminal needs to update an AS security key. Consequently, as a quantity of cells increases and cell coverage decreases, update frequency of the AS security key continuously increases. This frequent update of the AS security key results in great overheads.

SUMMARY

In view of this, this application provides a communication security processing method and apparatus, and a system, to reduce overheads caused by update of an AS security key.

In a communication security processing method, a terminal does not need to update an AS security key when being handed over between cells at a same RAN node or in a same RAN node group or area, and updates the AS security key only when being handed over between cells or frequencies at different RAN nodes or in different RAN node groups or areas. In this way, overheads required by AS security communication are reduced.

According to a first aspect, when being handed over from a source cell to a target cell, a terminal performs operations, including determining whether the source cell and the target cell are located at a same RAN node or in a same RAN node group or area; and when the source cell and the target cell are located at a same RAN node or in a same RAN node group or area, continuing using an AS root key used in the source cell, in other words, continuing using an AS security key used in the source cell.

In this way, the terminal does not need to update the AS security key, thereby reducing overheads of key update.

The terminal may determine, by using a plurality of methods, whether the source cell and the target cell are located at a same RAN node or in a same RAN node group or area. Several methods are enumerated below.

The terminal receives a handover command sent by a source RAN node. When the handover command does not include an NCC or an NCC included in the handover command is the same as a current NCC of the terminal, the terminal determines that the source cell and the target cell are located at a same RAN node or in a same RAN node group or area.

For another example, the terminal receives signaling sent by a source RAN node. The signaling is used to instruct the terminal to be handed over from the source cell to the target cell. When not receiving a derivation parameter, the terminal determines that the source cell and the target cell are located at a same RAN node or in a same RAN node group or area.

For another example, the terminal receives signaling sent by a source RAN node. The signaling is used to notify the terminal whether the source cell and the target cell are located at a same RAN node or in a same RAN node group or area, or is used to notify the terminal whether to derive an AS root key or update the AS security key. The terminal determines, based on the signaling, whether the source cell and the target cell are located at a same RAN node or in a same RAN node group or area.

According to a second aspect, when a terminal is handed over from a source cell to a target cell and the source cell and the target cell are located at different RAN nodes or in different RAN node groups or areas, the terminal performs operations including obtaining a derivation parameter, deriving a target AS root key based on a source AS root key and the derivation parameter, and calculating, based on the target AS root key, an AS security key used in the target cell. The source AS root key is an AS root key used in the source cell, the target AS root key is an AS root key used in the target cell, the derivation parameter is used to derive an AS root key and corresponds to a RAN node at which or a RAN node group or an area in which the target cell is located, and cells at a same RAN node or in a same RAN node group or area have a same derivation parameter.

According to a third aspect, a communication security processing apparatus is provided. The communication security processing apparatus is located in a terminal and configured to perform the method according to the first aspect or the second aspect. The apparatus has units for performing steps in the method according to the first aspect or the second aspect, or has a processor and a memory. The memory stores a program, and the processor invokes the program stored in the memory to perform the method according to the first aspect or the second aspect.

For example, the apparatus has a determining unit and a using unit to perform the method according to the first aspect. The determining unit is configured to determine whether a source cell and a target cell are located at a same RAN node or in a same RAN node group or area. The using unit is configured to, when the source cell and the target cell are located at a same RAN node or in a same RAN node group or area, continue using an AS root key used in the source cell, in other words, continue using an AS security key used in the source cell.

For example, the apparatus has an obtaining unit, a derivation unit, and a calculation unit. The obtaining unit is configured to obtain a derivation parameter when the terminal is handed over from a source cell to a target cell. The derivation parameter is used to derive an AS root key and the derivation parameter corresponds to a RAN node at which or a RAN node group or an area in which the target cell is located. Cells at a same RAN node or in a same RAN node group or area have a same derivation parameter. The derivation unit is configured to derive a target AS root key based on a source AS root key and the derivation parameter. The source AS root key is an AS root key used by the terminal in the source cell, and the target AS root key is an AS root key used by the terminal in the target cell. The calculation unit is configured to calculate, based on the target AS root key, an AS security key used in the target cell. The source cell and the target cell are located at different RAN nodes or in different RAN node groups or areas. The apparatus may further include a using unit, configured to communicate with a target RAN node by using the AS security key calculated by the calculation unit.

According to a fourth aspect, a communication security processing method is provided. The communication security processing method is performed by a RAN node and includes determining to hand over a terminal from a source cell to a target cell, determining whether the source cell and the target cell are located at a same RAN node or in a same RAN node group or area, and when the source cell and the target cell are located at a same RAN node or in a same RAN node group or area, continuing using a source AS root key, in other words, continuing using an AS security key used in the source cell, or when the source cell and the target cell are located at different RAN nodes or in different RAN node groups or areas, obtaining a derivation parameter, deriving a target AS root key based on a source AS root key and the derivation parameter, and sending the target AS root key to a target RAN node. The derivation parameter corresponds to a RAN node at which or a RAN node group or an area in which the target cell is located, and cells at a same RAN node or in a same RAN node group or area have a same derivation parameter.

According to a fifth aspect, a communication security processing apparatus is provided. The communication security processing apparatus is located at a RAN node and configured to perform the method according to the fourth aspect. The apparatus has units for performing steps in the method according to the fourth aspect, or has a processor and a memory. The memory stores a program, and the processor invokes the program stored in the memory to perform the method according to the fourth aspect.

For example, the apparatus includes a determining unit and a using unit. The determining unit is configured to determine whether a source cell and a target cell are located at a same RAN node or in a same RAN node group or area. The using unit is configured to, when the source cell and the target cell are located at a same RAN node or in a same RAN node group or area, continue using a source AS root key, in other words, continue using an AS security key used in the source cell.

For example, the apparatus includes a determining unit, an obtaining unit, a derivation unit, and a first sending unit. The determining unit is configured to determine whether a source cell and a target cell are located at a same RAN node or in a same RAN node group or area. The obtaining unit is configured to obtain a derivation parameter when the source cell and the target cell are located at different RAN nodes or in different RAN node groups or areas. The derivation parameter is used to derive an AS root key and the derivation parameter corresponds to a target RAN node at which or a RAN node group or an area in which the target cell is located. Cells at a same RAN node or in a same RAN node group or area have a same derivation parameter. The derivation unit is configured to derive a target AS root key based on a source AS root key and the derivation parameter. The first sending unit is configured to send the target AS root key to the target RAN node.

In the foregoing aspects, the derivation parameter may include the following parameters, including an identifier of the RAN node at which the target cell is located, an identifier of the RAN node group in which the target cell is located, a configured value corresponding to the RAN node at which or the RAN node group in which the target cell is located, an identifier of the area in which the target cell is located, or a terminal identifier. The terminal identifier is used to identify that the terminal is within a range of a RAN node allocating the terminal identifier to the terminal. The terminal identifier may be separately used as the derivation parameter, or may be used as the derivation parameter together with another derivation parameter to derive the target AS root key. In addition, RAN nodes in a same RAN node group or area allocate a same terminal identifier to the terminal. In this way, a range of not updating the AS security key can be further enlarged, and overheads of updating the AS security key can be further reduced.

In the foregoing aspects, the terminal may obtain the derivation parameter from the RAN node at which the source cell or the target cell is located. When the derivation parameter is obtained from the RAN node at which the source cell is located, the foregoing RAN node may further include a second sending unit, configured to send the derivation parameter to the terminal.

For example, when the derivation parameter is obtained from the RAN node at which the source cell is located, a handover command sent by the RAN node at which the source cell is located may be used to carry the derivation parameter, to send the derivation parameter to the terminal. In a handover process, the RAN node sends the handover command to the terminal to trigger handover of the terminal. Therefore, the derivation parameter may be carried in the handover command herein, which can be compatible with an existing handover procedure, and a new signaling exchange procedure can be avoided.

For another example, when the derivation parameter is obtained from the RAN node at which the target cell is located, the derivation parameter may be added to a system message broadcast by the target cell, or an ECGI is extended to carry the derivation parameter. In addition, the derivation parameter may alternatively be sent to the terminal by using an AS security mode command when the terminal performs AS security algorithm negotiation with the RAN node at which the target cell is located.

In the foregoing aspects, the terminal may set a same derivation parameter policy as that of a network side, for example, set a same initial value of the derivation parameter and a same update policy. In this case, the terminal and the RAN node set the same initial value of the derivation parameter and the same update policy, and the terminal updates the derivation parameter by using the update policy to obtain a derivation parameter. Similarly, the RAN node also updates the derivation parameter by using the update policy to obtain a derivation parameter.

The RAN node may update the derivation parameter when determining that the source cell and the target cell are located at different RAN nodes or in different RAN node groups or areas. In this case, the RAN node may send a notification message to the terminal to instruct the terminal to update the derivation parameter. The terminal may update the derivation parameter based on the notification message. In addition, the terminal may update the derivation parameter when determining that the source cell and the target cell are located at different RAN nodes or in different RAN node groups or areas.

The foregoing aspects may be applied to a first network. A RAN of the first network includes a CU node and a DU node, the CU node is connected to at least one DU node, the derivation parameter corresponds to a CU node at which or a CU node group in which the target cell is located, and cells at a same CU node or in a same CU node group have a same derivation parameter. For example, the derivation parameter includes an identifier of the CU node, an identifier of the CU node group, a configured value corresponding to the CU node, or a configured value corresponding to the CU node group.

The foregoing CU node may include a control plane CU entity and a user plane CU entity, and the derivation parameter includes a first parameter and/or a second parameter. The first parameter corresponds to a control plane CU entity or a control plane CU entity group in which the target cell is located, and cells at a same control plane CU entity or in a same control plane CU entity group have a same derivation parameter. The second parameter corresponds to a user plane CU entity at which or a user plane CU entity group in which the target cell is located, and cells at a same user plane CU entity or in a same user plane CU entity group have a same derivation parameter. For example, the first parameter includes an identifier of the control plane CU entity, an identifier of the control plane CU entity group, a configured value corresponding to the control plane CU entity, or a configured value corresponding to the control plane CU entity group. The second parameter includes an identifier of the user plane CU entity, an identifier of the user plane CU entity group, a configured value corresponding to the user plane CU entity, or a configured value corresponding to the user plane CU entity group.

It may be learned that in the foregoing aspects, the terminal does not need to update the AS security key when being handed over between cells at a same RAN node or in a same RAN node group or area, and updates the AS security key only when being handed over between cells or frequencies at different RAN nodes or in different RAN node groups or areas. In this way, the overheads required by the AS security communication are reduced.

DETAILED DESCRIPTION OF ILLUSTRATIVE EMBODIMENTS

Figure 1:
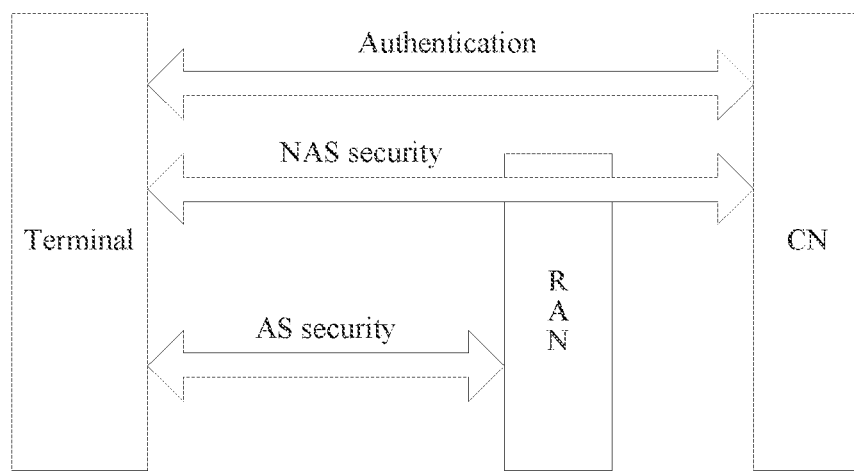
FIG. 1 is a schematic diagram of a security mechanism according to an embodiment of this application.

The following clearly describes the technical solutions in the embodiments of this application with reference to the accompanying drawings. Apparently, the described embodiments are merely some but not all of the embodiments of this application. All other embodiments obtained by a person of ordinary skill in the art based on the embodiments of this application without creative efforts shall fall within the protection scope of this application.

(1) A terminal is also referred to as user equipment (UE) or mobile equipment (ME), and is a device providing voice and/or data connectivity for a user. For example, the terminal is a handheld device or an in-vehicle device that has a wireless connection function. A common terminal includes, for example, a mobile phone, a tablet computer, a notebook computer, a palmtop computer, a mobile Internet device (MID), and a wearable device such as a smartwatch, a smart band, or a pedometer.

(2) A radio access network (RAN) is a part that is in a network and that connects a terminal to a wireless network. A RAN node is a device on a RAN side, and includes, but is not limited to, an evolved NodeB (eNB), a radio network controller (RNC), a NodeB (NB), a base station controller (BSC), a base transceiver station (BTS), a home base station (for example, Home evolved NodeB or Home NodeB, HNB), a baseband unit (BBU), a WiFi access point (AP), or the like. In addition, in a network structure described in an embodiment of this application, the RAN may include nodes such as a centralized unit (CU) and a distributed unit (DU). In an embodiment having the network structure in this application, the RAN node is a CU node.

(3) An AS root key is used as input of an AS security algorithm and is a parameter used to calculate an AS security key. For example, the AS root key may include a KeNB or a next hop (NH) key, referred to as an NH for short. In addition, in the network structure in which the RAN includes nodes such as the CU and the DU and that is described in an embodiment of this application, the AS root key may include a $K_{CU}$. In a terminal handover process, an AS root key used in a source cell may be referred to as a source AS root key, and an AS root key used in a target cell may be referred to as a target AS root key.

(4) A derivation parameter is a parameter used to derive an AS root key.

(5) An identifier of a RAN node is used to identify a corresponding RAN node. An identifier of a RAN node group is used to identify a corresponding RAN node group, and the RAN node group has at least one RAN node. An identifier of an area is used to identify a corresponding area.

(6) "A plurality of" refers to two or more, and other quantifiers are similar. The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects.

Referring to FIG. 1, FIG. 1 is a schematic diagram of a security mechanism according to an embodiment of this application. As shown in FIG. 1, the security mechanism mainly includes the following several aspects.

First, authentication is used to perform, when a terminal accesses a wireless network, identity authentication between the terminal and the network. The process may also be referred to as access authentication, is bidirectional, and is performed between the terminal and a core network (CN) device. In addition to completing mutual authentication between the terminal and the network, the authentication process is further used to generate a root key $K_{ASME}$.

Second, NAS security is used to negotiate a NAS security algorithm between the terminal and the network and generate a NAS security key based on the NAS security algorithm and the root key $K_{ASME}$. The NAS security key includes a NAS encryption key NAS_enc and a NAS integrity protection key NAS_int. In this way, NAS signaling exchanged between the terminal and the network can be protected by the NAS security key.

Negotiation of the NAS security algorithm is performed between the terminal and the CN device, and the NAS security key is generated by the terminal and the CN device based on the negotiated NAS security algorithm and the root key $K_{ASME}$.

Third, access stratum (AS) security is used to negotiate an AS security algorithm between the terminal and the network and generate an AS security key based on the AS security algorithm. The AS security key includes a signaling-plane encryption key Krrcenc, a signaling-plane integrity protection key Krrcint, and a user-plane encryption key Kupenc. User-plane data may be encrypted only and no integrity protection is performed on the user-plane data. In some scenarios, for example, in scenarios such as a relay scenario or a Cellular Internet of Things (CIoT) scenario, integrity protection may be performed on the user-plane data. In this case, the AS security key may further include a user-plane integrity protection key Kupint. AS security protection can be performed, by using the AS security key, on signaling and the user-plane data that are exchanged between the terminal and a RAN device.

Figure 2:
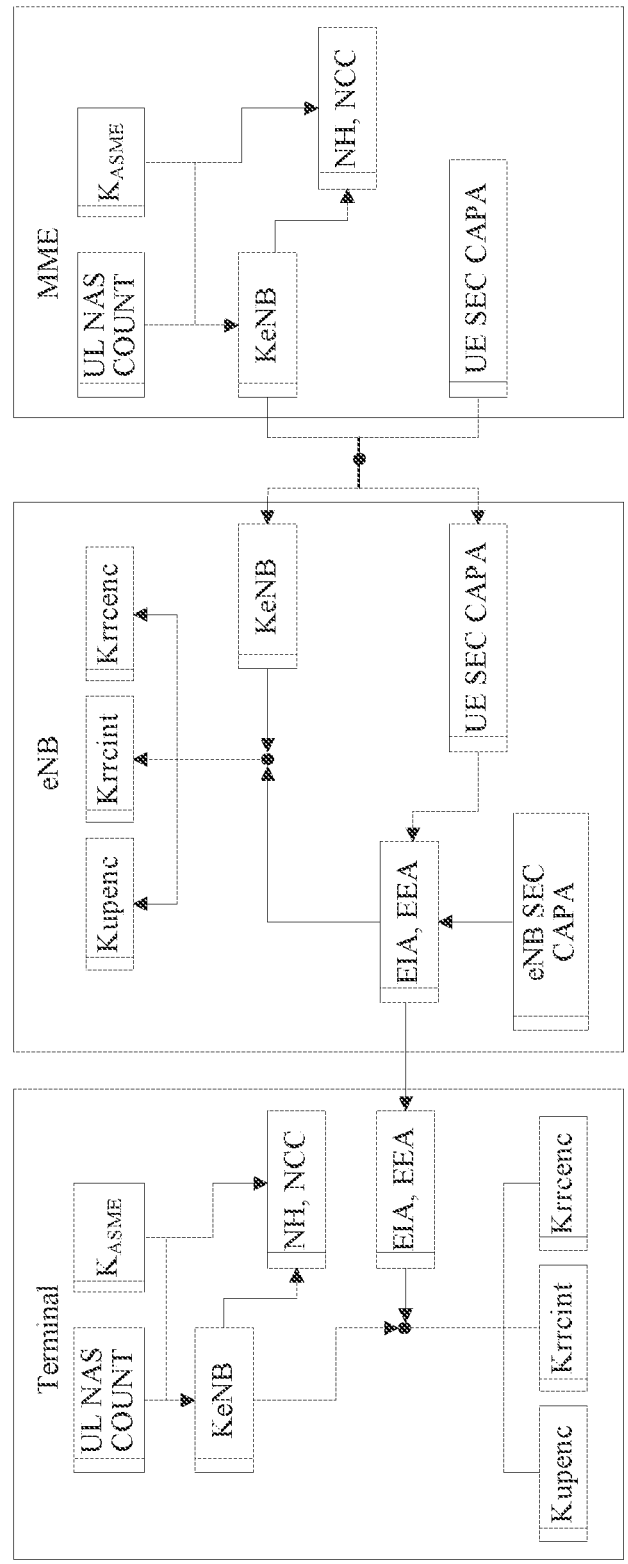
FIG. 2 is a schematic diagram of a generation process of an AS security key according to an embodiment of this application.
Figure 3:
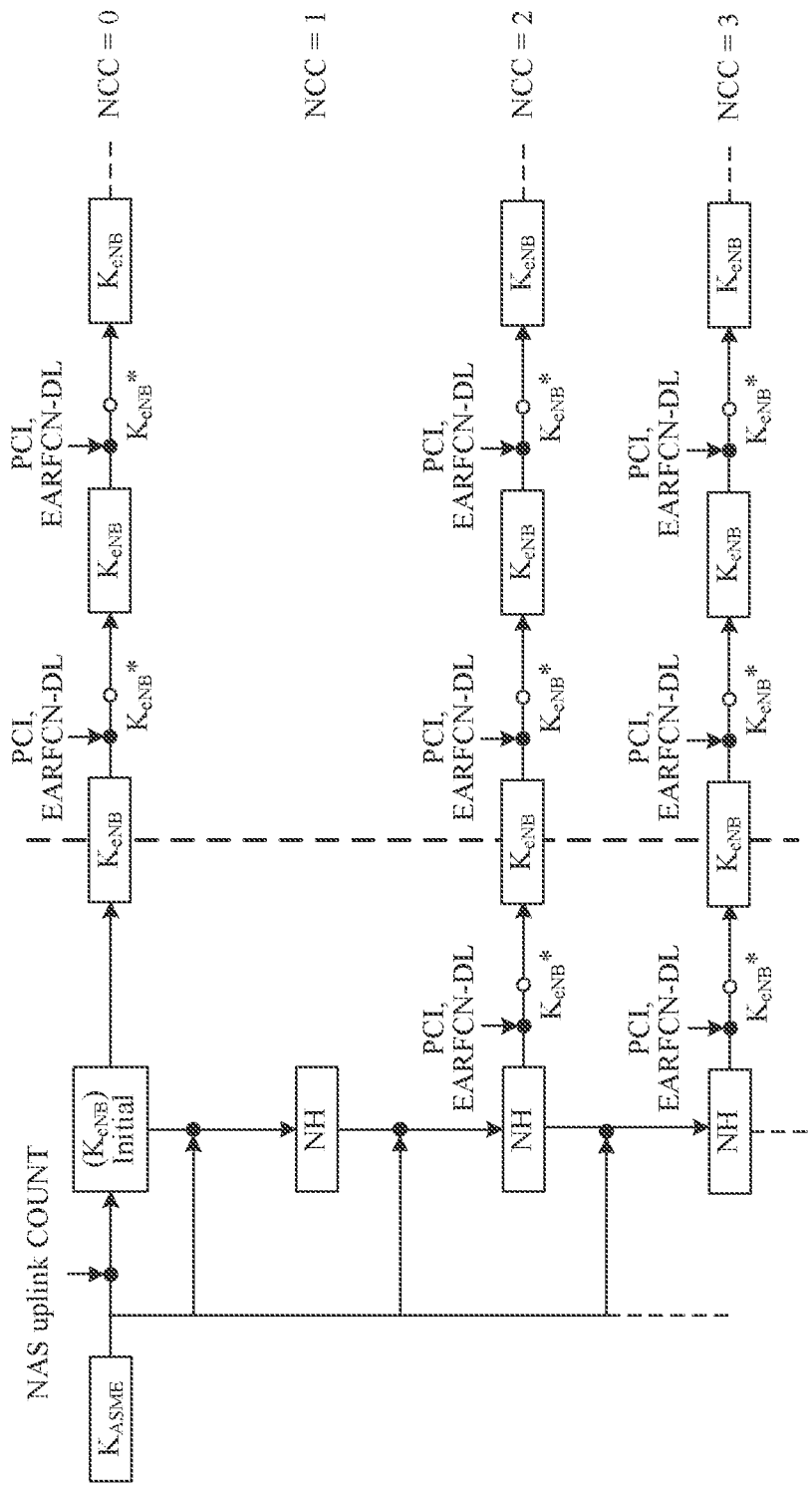
FIG. 3 is a schematic diagram of derivation of an AS root key in the prior art.

In an AS security process, after negotiating the AS security algorithm, the terminal and the RAN device calculate the AS security key by using the AS security algorithm and an AS root key. With reference to FIG. 2 and FIG. 3 below, a generation process of the AS security key is described by using a Long Term Evolution (LTE) system as an example. The RAN device is an eNB, and the CN device is a mobility management entity (MME). FIG. 2 is a schematic diagram of the generation process of the AS security key, and FIG. 3 is a schematic diagram of derivation of an AS root key in the prior art.

The terminal and the eNB negotiate the AS security algorithm based on mutual security capabilities. For example, as shown in FIG. 2, the terminal and the eNB perform negotiation based on a terminal security capability (UE SEC CAPA) and an eNB security capability (eNB SEC CAPA) to obtain an evolved packet system integrity algorithm (EIA) and an evolved packet system encryption algorithm (EEA), and then calculate the AS security key based on the negotiated algorithm and the AS root key. As shown in FIG. 2, the AS security key includes a signaling-plane encryption key Krrcenc, a signaling-plane integrity protection key Krrcint, and a user-plane encryption key Kupenc. In some scenarios, the AS security key may further include a user-plane integrity protection key Kupint. The AS root key may be a KeNB or may be an NH. With reference to FIG. 3, when the terminal initially accesses a network or a status is converted, for example, when the terminal is initially attached to the network or is converted from an idle state to a connected state, the AS root key KeNB is generated by the MME and the terminal based on a root key $K_{ASME}$ and a NAS uplink count, and the MME sends the generated AS root key KeNB to the eNB, so that the eNB calculates the AS security key. To distinguish from a subsequently generated KeNB, the AS root key KeNB is referred to as an initial AS root key (initial KeNB for short). When the terminal is handed over from a source cell to a target cell, a new AS root key KeNB (represented by KeNB* in FIG. 3) needs to be derived to generate a new AS security key. As shown in FIG. 3, there are currently two derivation methods.

Horizontal derivation (also referred to as transverse derivation): a KeNB used by the terminal in the target cell is generated based on a KeNB used by the terminal in the source cell, a physical cell identifier (PCI) of the target cell, and an evolved universal terrestrial radio access (E-UTRA) absolute radio frequency channel number-downlink (EARFCN-DL) of the target cell.

Vertical derivation (also referred to as longitudinal derivation): a KeNB used by the terminal in the target cell is generated based on an NH stored in a source eNB, a PCI of the target cell, and an EARFCN-DL of the target cell. The KeNB is used to calculate the AS security key, and the NH is associated with the KeNB. Therefore, the NH may also be understood as a root key for calculating the AS security key. Both the KeNB and the NH may be further derived. The KeNB is used for horizontal derivation, and the NH is used for vertical derivation. Each NH corresponds to a next hop chaining count (NCC). The initial KeNB is directly derived by using $K_{ASME}$. It may be considered that the initial KeNB is associated with a virtual NH whose NCC value is 0. The first NH is derived by using the $K_{ASME}$ and the initial KeNB, and an NCC value corresponding to a value of the NH is 1. Subsequently, the NCC is increased by 1 each time a next NH is derived based on a current NH.

Currently, in a handover process, the terminal needs to derive the AS root key by using parameters such as the PCI and the EARFCN-DL. Therefore, the AS security key needs to be updated for each handover. Consequently, as a quantity of cells increases and cell coverage decreases, update frequency of the AS security key continuously increases. This frequent update of the AS security key results in great overheads.

Figure 4:
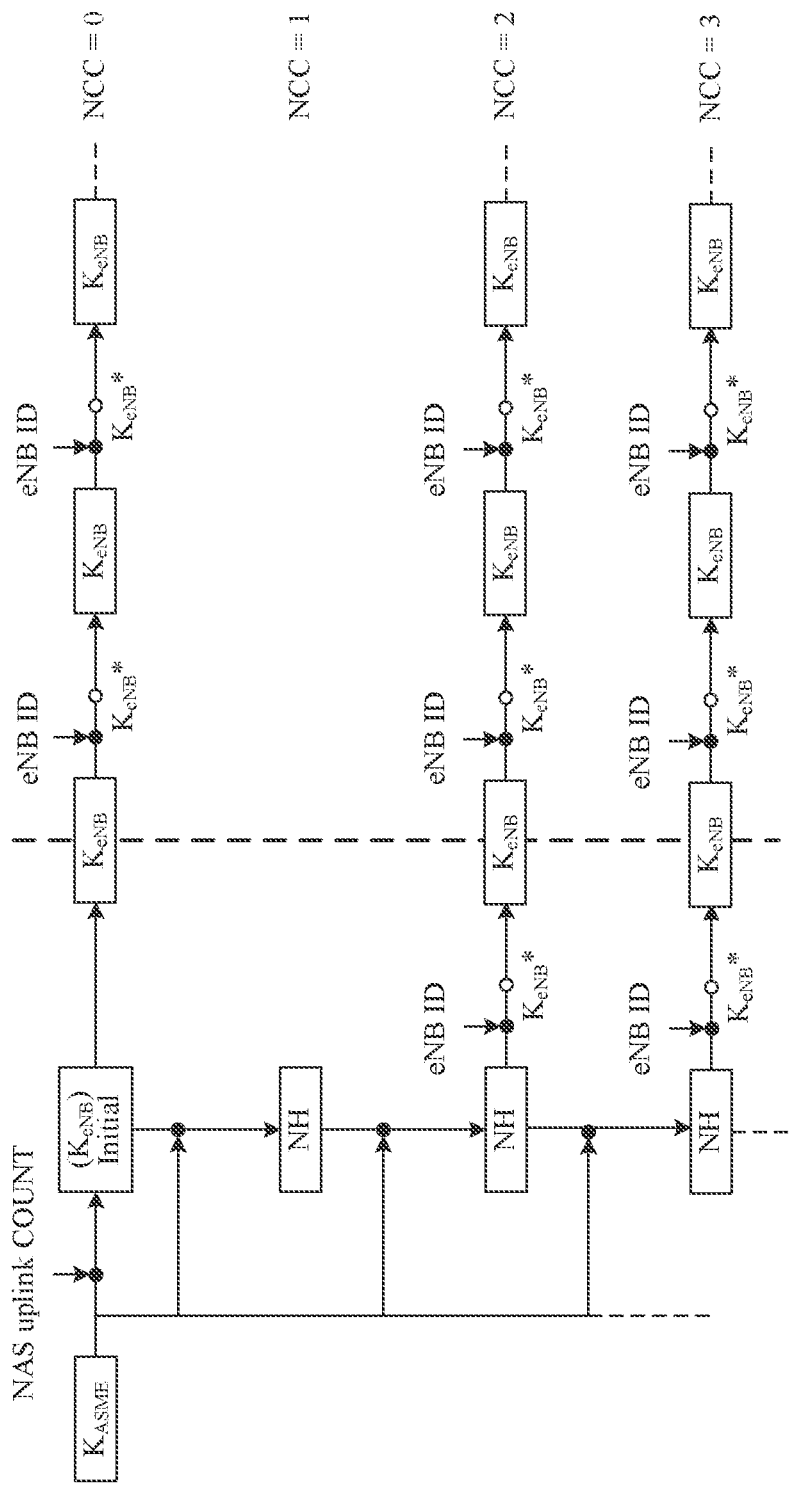
FIG. 4 is a schematic diagram of derivation of an AS root key according to an embodiment of this application.

In consideration of the problem, this application provides a key derivation mechanism. In the key derivation mechanism, the PCI and the EARFCN-DL are no longer used as derivation parameters of an AS root key, and an eNB identifier (eNB ID) is used as a derivation parameter to derive the AS root key, as shown in FIG. 4. In addition, all cells served by an eNB corresponding to the eNB ID have a same derivation parameter, in other words, the eNB ID. That is, when the terminal is handed over between cells served by the eNB, if an AS security key is updated, an AS root key is derived by using a same derivation parameter, and the derived AS root key is the same. Therefore, the AS security key does not need to be updated, thereby reducing overheads of key update.

The foregoing eNB may be different RAN nodes in different wireless networks, and the derivation parameter may be an identifier of the RAN node. In addition, the identifier of the RAN node may be replaced with a configured value, that is, a value is configured for each RAN node. For example, the configured value may be a random number. In addition, if the AS root key is derived by using the configured value, all cells served by the RAN node use the configured value as the derivation parameter of the AS root key, and the terminal does not need to update the AS security key when being handed over between cells served by the RAN node. In addition, the identifier of the RAN node may alternatively be replaced with an identifier of an area. Cells in the area all use the identifier of the area as the derivation parameter of the AS root key. In this way, the terminal does not need to update the AS security key when being handed over between cells in the area. Further, an identifier of a RAN node group may alternatively be set, and cells served by RAN nodes in the group all use the identifier of the RAN node group as the derivation parameter of the AS root key. In this way, the terminal does not need to update the AS security key when being handed over between cells in the group.

In addition, a same update policy of the derivation parameter may further be set on the terminal and at the RAN node. When the terminal is handed over between cells served by the RAN node, the derivation parameter is not updated. When the terminal is handed over between RAN nodes, the derivation parameter is updated by using the update policy. The terminal and the RAN node update the derivation parameter by using the same update policy. Therefore, an updated derivation parameter on the terminal is the same as that in a target cell, derived target AS root keys are the same, and AS security keys are the same. Therefore, AS communication between the target cell and the terminal can be protected by using the AS security key.

For example, the foregoing update policy may be implemented by using a counter. A counter is configured both on the terminal and at the RAN node. The terminal and the RAN node maintain respective counters, and set an initial value of the counter, for example, set the initial value to 0 or 1. Certainly, the initial value may alternatively be set to another arbitrary value. When the terminal and the RAN node establish an initial connection, two counters both use the initial value. When the terminal is handed over in the RAN node, the RAN node and the terminal do not need to update a value of the counter. When the terminal is handed over between RAN nodes, the RAN node may notify the terminal of a node change. The terminal accordingly updates the value of the counter, and the RAN node also updates the value of the counter in a same manner. For example, the RAN node and the terminal update the value of the counter in a same update manner, so that a network side and the terminal maintain a same derivation parameter to obtain a same AS root key, and further use a same AS security key. It may be learned that in this embodiment, the derivation parameter is the value of the counter. In addition, when the terminal is handed over between RAN nodes, the RAN node and the terminal update the derivation parameter by using a same update policy. It may be learned that in this embodiment, cells served by a same RAN node have a same derivation parameter.

Figure 5:
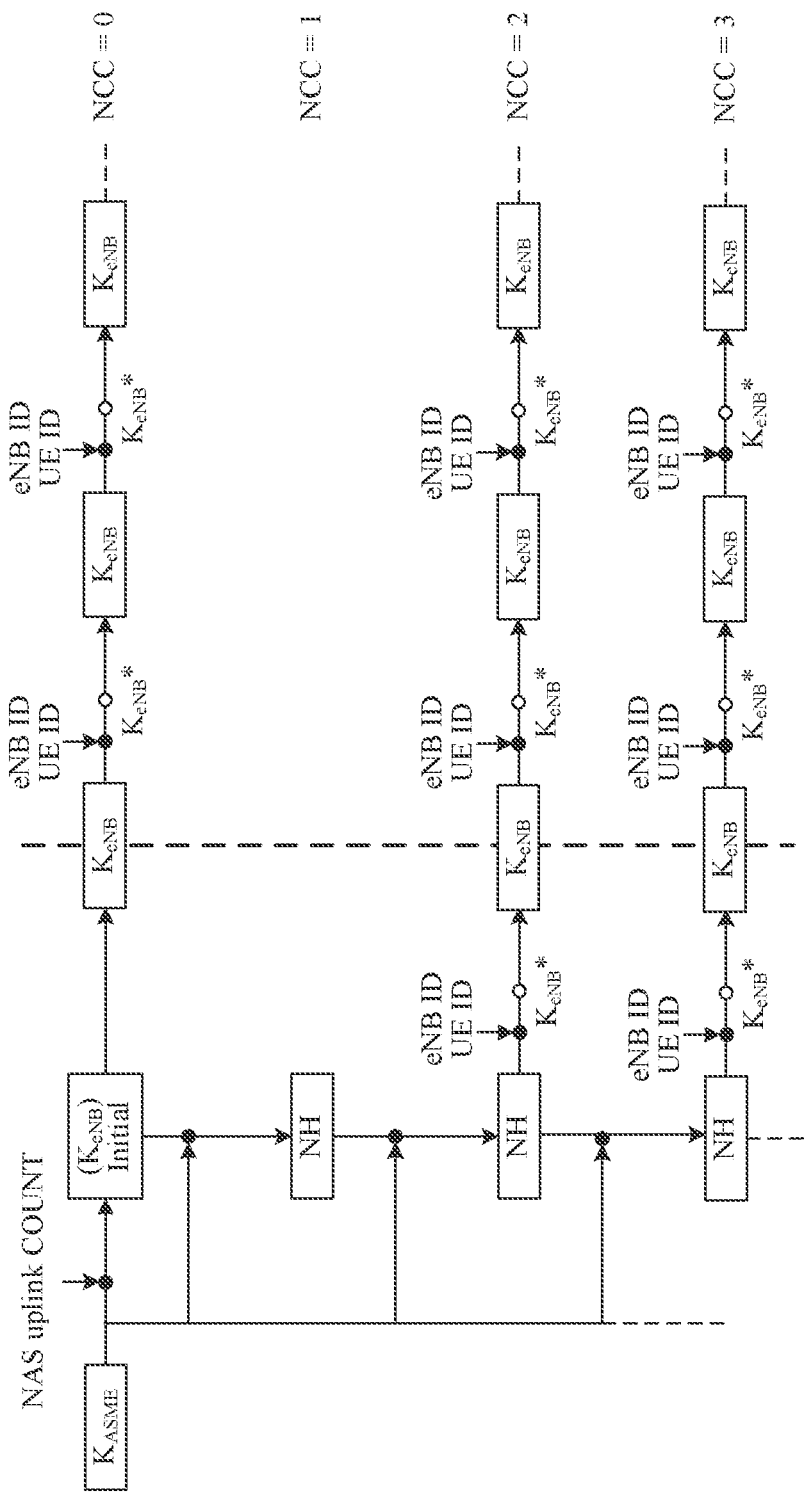
FIG. 5 is a schematic diagram of another derivation of an AS root key according to an embodiment of this application.

In another implementation, the derivation parameter may be a terminal identifier (also referred to as a terminal ID, a UE ID, or an ME ID). The terminal identifier is identification information allocated by the RAN node to the terminal and is not limited to a content form of the terminal identifier. The terminal identifier is used to identify that the terminal is within a range of the RAN node. If a RAN node accessed by the terminal changes, the corresponding terminal identifier changes. Therefore, the terminal identifier may be used as the derivation parameter, so that the derivation parameter remains unchanged when the terminal is handed over between cells served by the RAN node, the terminal continues to use an AS root key used in a source cell, and the AS security key remains unchanged, thereby reducing the overheads of the key update. Each RAN node allocates a terminal identifier to the terminal, and terminal identifiers allocated by RAN nodes may be different. Therefore, when the terminal is from a source RAN node to a target RAN node, the terminal identifier changes. The derivation parameter is a terminal identifier allocated by the target RAN node to the terminal, that is, corresponds to a RAN node at which the target cell is located. Certainly, RAN nodes in a RAN node group may be set to allocate a same terminal identifier to the terminal. In this way, the terminal does not need to update the AS security key when being handed over between cells in the RAN node group. In addition, RAN nodes in an area may be set to allocate a same terminal identifier to the terminal. In this way, the terminal does not need to update the AS security key when being handed over between cells in the area. In addition, the derivation parameter, the terminal identifier, may be separately used, or may be combined with any one of the foregoing derivation parameters as an input parameter for deriving the AS root key, that is, the AS root key is derived by using at least two input parameters. For example, referring to FIG. 5, in this embodiment, an eNB ID and a UE ID are used as derivation parameters of the AS root key.

In the foregoing embodiment, the derivation parameter corresponding to the RAN node, the RAN node group, or the area is designed, and all cells within a range of a same RAN node, RAN node group, or area have a same derivation parameter of the AS root key. In this way, when the terminal is handed over between cells in the range, although the AS root key is re-derived, a same root key is derived. Therefore, derivation is not required, and the AS security key does not need to be updated, thereby reducing overheads of updating the AS security key.

Figure 6:
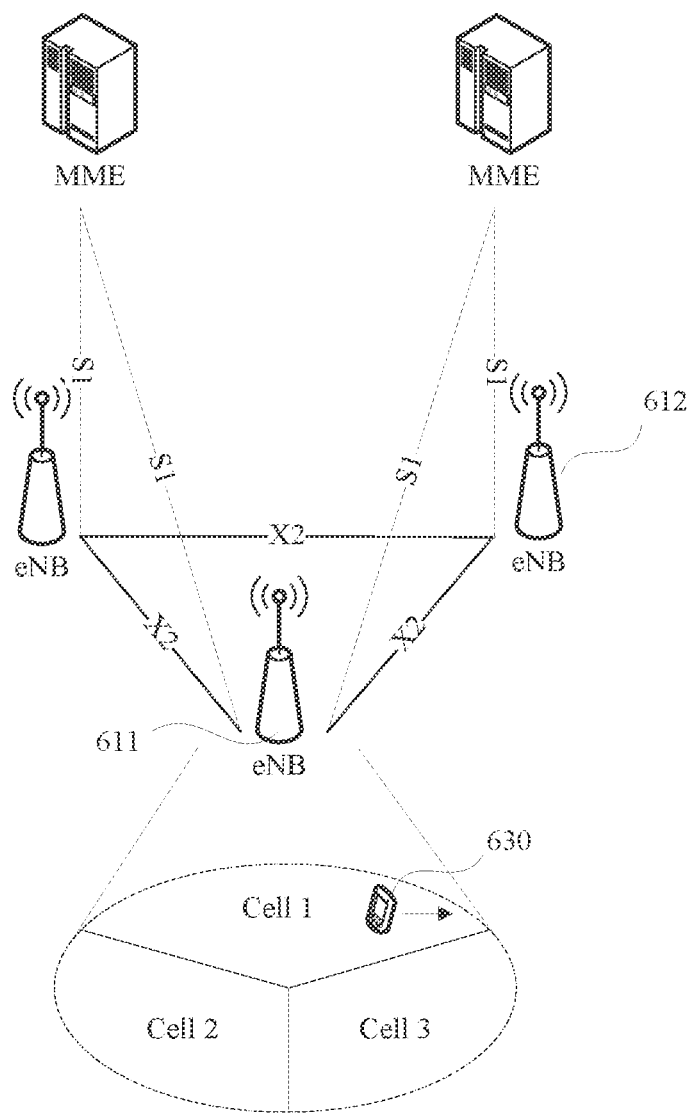
FIG. 6 is a schematic diagram of a communication scenario to which an embodiment of this application is applied.

An LTE system is used as an example below. In the LTE system, the RAN node is an eNB, and the derivation parameter corresponds to an eNB, an eNB group, or an area. As shown in FIG. 6, the LTE system includes eNBs 610 and MMEs 620. An interface between the MME 620 and the eNB 610 is an S1 interface, and an interface between the eNBs 610 is an X2 interface. In addition, each eNB controls a plurality of cells, for example, a cell 1 to a cell 3, and each cell is allocated with a PCI. In the prior art, the PCI and an EARFCN-DL are used as derivation parameters of an AS root key. In this embodiment, an eNB ID is used as a derivation parameter. In this way, when a terminal 630 is handed over between cells served by an eNB, for example, handed over from the cell 1 to the cell 3, an AS security key does not need to be updated because the derivation parameter, the eNB ID, remains unchanged. When the terminal is handed over from an eNB 611 to an eNB 612, the derivation parameter, the eNB ID, changes. Therefore, a target AS root key is derived based on an eNB ID of the eNB 612, and an AS security key used in a target cell is calculated based on the target AS root key.

An eNB ID is used to identify a corresponding eNB. If cells served by the eNB use the eNB ID of the eNB as a derivation parameter, the cells have a same derivation parameter. If a value configured for each eNB is used as a derivation parameter of all cells served by the eNB, the cells can also be ensured to have a same derivation parameter. Therefore, a configured value corresponding to the eNB may be used to replace the eNB ID and to serve as the derivation parameter. In addition, cells served by a plurality of eNBs may use a same derivation parameter to further enlarge a range of not updating the AS security key. In this case, an identifier of an eNB group may be used as the derivation parameter. In addition, cells in an area may use a same derivation parameter, and an identifier of the area is used as the derivation parameter. The identifier of the area is, for example, a tracking area (TA) identifier.

The foregoing derivation parameter may be sent by a CN device to the RAN node. Then, the RAN node sends the derivation parameter to the terminal for synchronization. The CN device may send the derivation parameter to the RAN node in a plurality of manners. The following provides descriptions by using examples and is not intended to limit this application.

For example, when the terminal establishes a connection with a network, the CN device sends the derivation parameter to the RAN node. For example, using an LTE system as an example, in an initial context setup process, an MME sends the derivation parameter to an eNB by using an initial context setup request message. For another example, when an interface is set up between the RAN node and the CN device, the CN device sends the derivation parameter to the RAN node. For example, in an LTE system, in an S1 setup process, an MME sends the derivation parameter to an eNB by using an S1 setup response message.

The following provides descriptions by using an eNB ID as an example, other derivation parameters are similar to the eNB ID, and details are not described herein.

Figure 7:
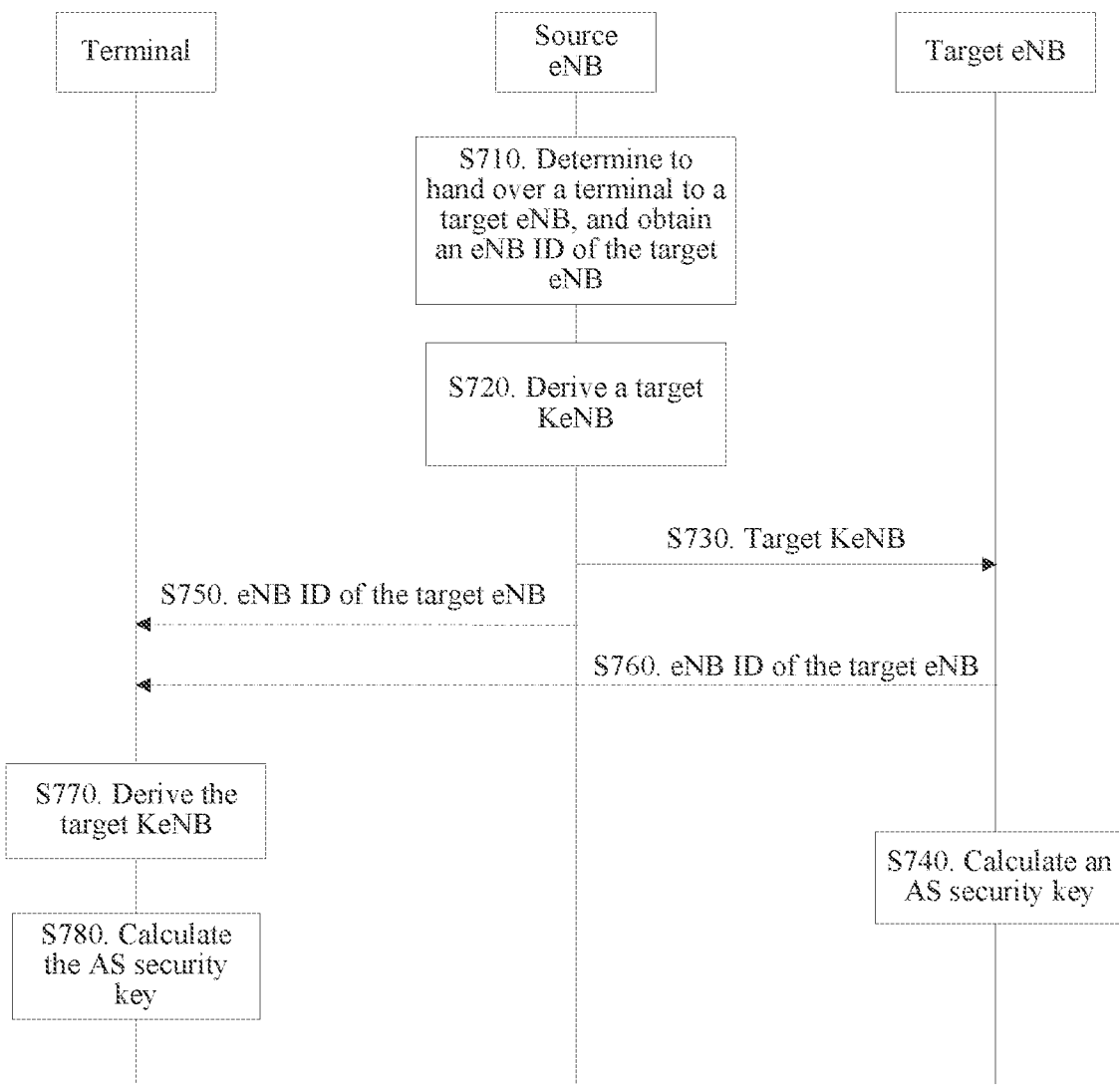
FIG. 7 is a schematic diagram of a communication security processing method according to an embodiment of this application.

Referring to FIG. 7, FIG. 7 is a schematic diagram of a communication security processing method according to an embodiment of this application. The method is applied to processing of AS security when a terminal is handed over from a source cell to a target cell. This embodiment is also described on the background of an LTE system by using an example in which an eNB ID is used as a derivation parameter. Other derivation parameters are similar to the eNB ID, and details are not described herein. As shown in FIG. 7, the source cell and the target cell are located in different eNBs, in other words, a source eNB and a target eNB. The method includes the following steps.

S710: The source eNB determines to hand over the terminal to the target eNB, and obtains an eNB ID of the target eNB.

For example, the source eNB may determine the target cell based on a measurement report reported by the terminal, and further determine the eNB ID of the target eNB. Each eNB ID may be allocated by an MME and sent to a corresponding eNB. Then, eNBs interact with each other to obtain an eNB ID of one another. This has been described in the foregoing embodiment, and details are not described herein again.

When an X2 interface is set up, the eNBs may exchange eNB IDs of the eNBs and cell lists corresponding to the eNB IDs of the eNBs. In this way, the source eNB may obtain the eNB ID of the target eNB based on a cell identifier (cell ID) of the target cell, to derive a target AS root key by using the eNB ID of the target eNB. When the X2 interface is not set up between the source eNB and the target eNB, the eNB ID of the target eNB may also be obtained by using an S1 interface.

S720: The source eNB derives a target KeNB (that is, an AS root key used in the target cell) based on an NH or a source KeNB (that is, an AS root key used in the source cell) that is stored in the source eNB and the eNB ID of the target eNB.

S730: The source eNB sends the derived target KeNB to the target eNB, so that the target eNB calculates an AS security key.

S740: After receiving the target KeNB sent by the source eNB, the target eNB calculates the AS security key by using the target KeNB.

In this case, the terminal also needs to update the AS security key. To enable the terminal to derive an AS root key by using the same derivation parameter, the source eNB or the target eNB sends the derivation parameter, the eNB ID of the target eNB, to the terminal. For example, the following step S750 or S760 is performed.

S750: The source eNB sends the eNB ID of the target eNB to the terminal.

For example, the source eNB may add the eNB ID of the target eNB to a handover command sent to the terminal.

S760: The target eNB sends the eNB ID of the target eNB to the terminal.

For example, the target eNB may add the eNB ID of the target eNB to a system message broadcast to the terminal, or extend an ECGI, and send the eNB ID of the target eNB by using the ECGI, or send the eNB ID of the target eNB to the terminal when negotiating an AS security algorithm with the terminal.

S770: The terminal derives the target KeNB based on a current NH or the source KeNB and the eNB ID of the target eNB.

S780: The terminal calculates, based on the target KeNB, the AS security key used in the target cell.

It should be noted that the foregoing step sequence numbers S710 to S780 are not intended to limit an order of the steps. For example, the source eNB may first send the eNB ID of the target eNB to the terminal and then derive the target KeNB. Alternatively, the source eNB may send the eNB ID of the target eNB to the terminal and derive the target KeNB at the same time. For another example, the target eNB may first send the eNB ID of the target eNB to the terminal and then calculate the AS security key.

Figure 8:
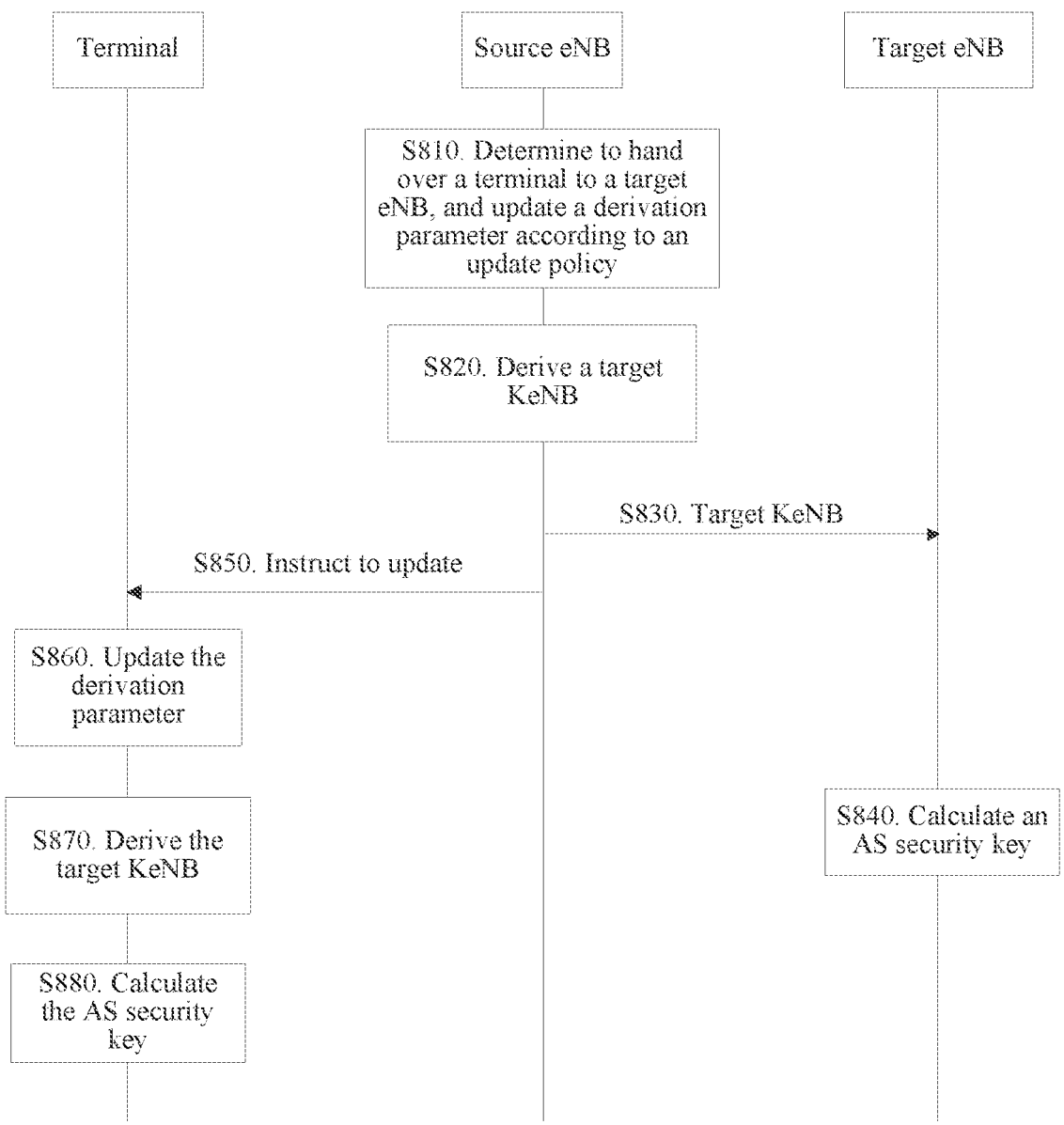
FIG. 8 is a schematic diagram of another communication security processing method according to an embodiment of this application.

In another implementation, the terminal and a network side may configure a same derivation parameter policy, for example, set a same initial value of the derivation parameter and a same update policy. The initial value of the derivation parameter and the update policy may be set at each RAN node, for example, in the eNB. When the terminal is handed over between cells served by the eNB, the derivation parameter is not updated, and the terminal and the eNB do not need to update the AS security key. When the terminal is handed over between eNBs, the eNB may instruct the terminal that the eNB has updated the derivation parameter. Specifically, referring to FIG. 8, FIG. 8 is a schematic diagram of another communication security processing method according to an embodiment of this application. As shown in FIG. 8, the method is applied to processing of AS security when a terminal is handed over from a source cell to a target cell. The source cell and the target cell are located in different eNBs, in other words, a source eNB and a target eNB. A same derivation parameter policy as that of the terminal is set on a network side. For example, a same initial value of a derivation parameter and a same update policy are set on the source eNB and the terminal. The method includes the following steps.

S810: The source eNB determines to hand over the terminal to the target eNB, and updates the derivation parameter according to the update policy, where the derivation parameter before updating may be a derivation parameter having the initial value or may be a derivation parameter updated for one time or a plurality of times.

For example, a counter may be set on the source eNB. The counter has an initial value A and an update step of the counter is B. When the terminal needs to be handed over to the target eNB, the source eNB updates the counter based on the update step B, and an updated count is a derivation parameter for deriving a target KeNB.

S820: The source eNB derives a target KeNB based on an NH or a source KeNB that is stored in the source eNB and an updated derivation parameter.

S830: The source eNB sends the derived target KeNB to the target eNB, so that the target eNB calculates an AS security key.

S840: After receiving the target KeNB sent by the source eNB, the target eNB calculates the AS security key by using the target KeNB.

In this case, the terminal also needs to update the AS security key. To enable the terminal to derive an AS root key by using the same derivation parameter, the source eNB instructs the terminal to update the derivation parameter, or the terminal determines, by using an eNB ID, that the eNB is changed, to update the derivation parameter. An example in which the source eNB instructs the terminal is used herein for description.

S850: The source eNB instructs the terminal to update the derivation parameter.

The instruction manner may be in any form, for example, sending indication information to instruct the terminal to update the derivation parameter, or sending an eNB ID of the target eNB. This application is not limited thereto.

S860: The terminal updates the derivation parameter based on the instruction. The update policy of the terminal is the same as that of the network side. Therefore, an updated derivation parameter is also the same.

For example, a counter may also be set on the terminal. The counter also has an initial value A and an update step of the counter is B. When the terminal needs to be handed over to the target eNB, the terminal updates the counter based on the update step B, and an updated count is used as a derivation parameter for deriving the target KeNB.

S870: The terminal derives the target KeNB based on a current NH or the source KeNB and the updated derivation parameter.

S880: The terminal calculates, based on the target KeNB, the AS security key used in the target cell.

When the terminal determines, by using the eNB ID, that the eNB is changed, the source eNB sends an eNB ID of the source eNB to the terminal. In addition, during handover, the source eNB or the target eNB sends the eNB ID of the target eNB to the terminal, so that the terminal determines whether the eNB is changed.

Similarly, the foregoing step sequence numbers S810 to S880 are not intended to limit an order of the steps.

It may be learned that in the embodiments provided in this application, the derivation parameter is configured for each RAN node, RAN node group, or area. Cells served by a same RAN node, RAN node group, or area have a same derivation parameter. When the source cell and the target cell are located at a same RAN node or in a same RAN node group or area, the terminal does not need to update the AS security key. In this way, overheads of updating the AS security key can be reduced. The method is also applicable to the following networks shown in FIG. 9 and FIG. 10.

Figure 9:
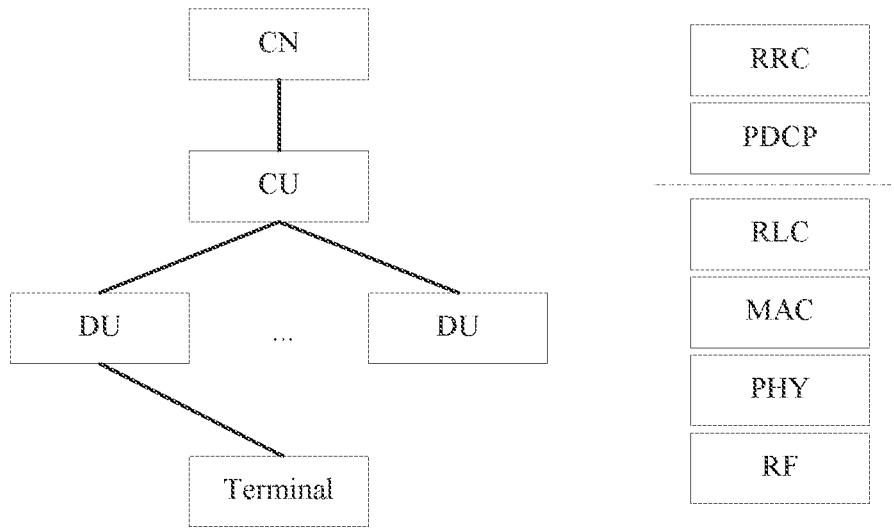
FIG. 9 is a schematic diagram of a network architecture according to an embodiment of this application.

Referring to FIG. 9, FIG. 9 is a schematic diagram of another network architecture according to an embodiment of this application. As shown in FIG. 9, the network includes a CN, a RAN, and a terminal. A structure of the RAN is different from that in the foregoing LTE network architecture, and includes a centralized unit (CU) and distributed units (DU). The structure splits protocol layers of an eNB in LTE. Functions at some protocol layers are centrally controlled in the CU, and functions at part or all of remaining protocol layers are distributed in the DUs. The CU centrally controls the DUs. For example, as shown in FIG. 9, a PDCP and a protocol layer above the PDCP are deployed in the CU for centralized implementation, and an RLC, a MAC, and a protocol layer below are deployed in the DUs for implementation. In addition, a radio frequency part may be remotely deployed and not deployed in the DU, or may be integrated into the DU. This is not limited herein.

Figure 10:
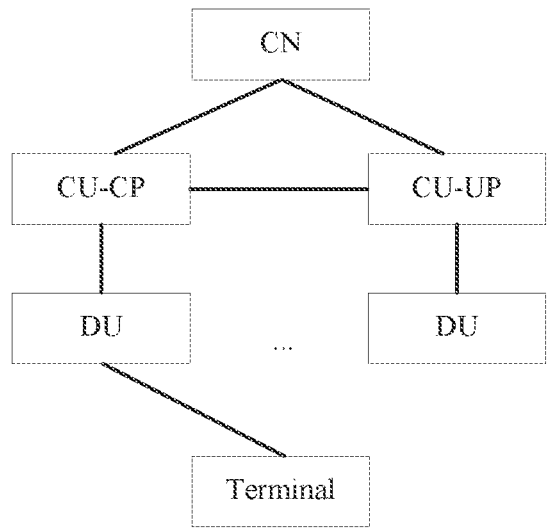
FIG. 10 is a schematic diagram of another network architecture according to an embodiment of this application.

In addition, continuing to refer to FIG. 10, relative to the architecture shown in FIG. 9, a control plane and a user plane of the CU may be further separated into different entities for controlling. The different entities are respectively a control plane CU entity, a CU-CP entity, a user plane CU entity, and a CU-UP entity. In the network architecture, the terminal may hand over only the control plane to the target cell and maintain the user plane in the source cell. Alternatively, the terminal may hand over only the user plane to the target cell and maintain the control plane in the source cell.

Figure 11:
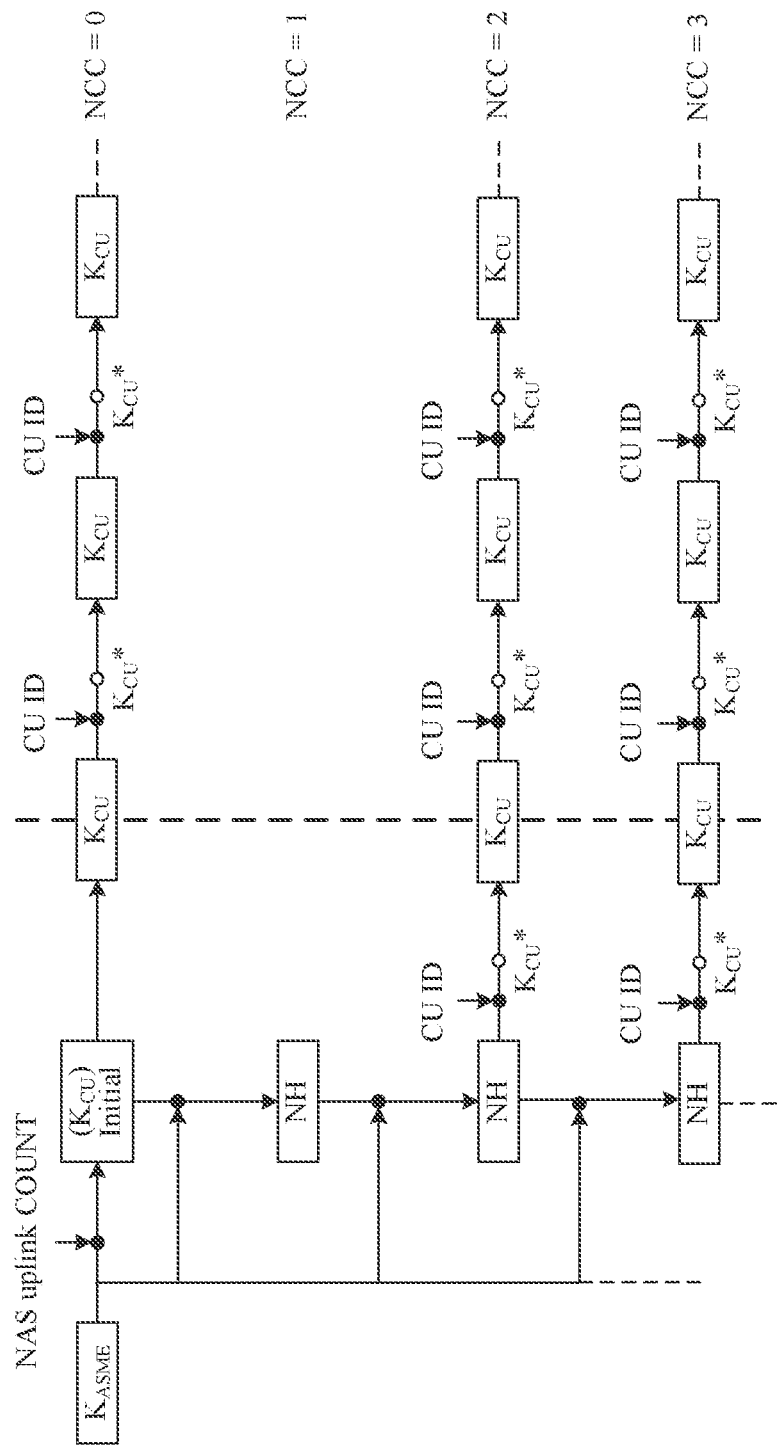
FIG. 11 is a schematic diagram of still another derivation of an AS root key according to an embodiment of this application.

In the network structure shown in FIG. 9, a CU identifier (CU ID) may be configured for each CU node, and a target AS root key is derived by using the CU ID. As shown in FIG. 11, in this embodiment, the CU ID is used as a derivation parameter of an AS root key. The CU ID is configured for each CU. Therefore, when the terminal is handed over in a CU range, for example, is handed over to a cell in a different DU in a same CU, an AS root key derived by using the CU ID remains unchanged. Therefore, an AS security key does not need to be updated. In this way, overheads of updating the AS security key are reduced.

Further, a plurality of CUs may be classified into one CU group, and a group identifier is configured for each CU group. The group identifier is used as a derivation parameter, and the AS security key does not need to be updated when the corresponding terminal is handed over in the group.

The foregoing CU identifier and CU group identifier may be replaced with another parameter, provided that the parameter can uniquely identify the CU and the CU group. For example, the CN may configure a value (for example, a random number) for each CU, and the CU is identified by using the configured value. Similarly, a value may also be configured for each CU group, and the CU group is identified by using the configured value. Alternatively, an area identifier may be defined.

In the network structure shown in FIG. 10, the CU-CP and the CU-UP may be considered as a CU, and the foregoing solutions of the CU identifier, the CU group identifier, the configured value corresponding to the CU or the CU group, or the area identifier may also be applied to the network structure. In addition, a CU-CP identifier (CU-CP ID) may be configured for each CU-CP, and a CU-UP identifier (CU-UP ID) may be configured for each CU-UP. A target AS root key is derived by using the CU-CP ID and/or the CU-UP ID. In addition, a plurality of CU-CPs may be classified into a CU-CP group, and a group identifier is configured for each CU-CP group. The group identifier is used as a derivation parameter. Similarly, the CU-CP identifier and the CU-CP group identifier may be replaced with another parameter, provided that the parameter can uniquely identify the CU-CP and the CU-CP group. For example, the CN may configure a value (for example, a random number) for each CU-CP, and the CU-CP is identified by using the configured value. Similarly, a value may also be configured for each CU-CP group, and the CU-CP group is identified by using the configured value. Alternatively, an area identifier may be defined. The CU-UP is similar to the CU-CP, and details are not described herein again. In this way, when the terminal hands over the control plane to the target cell and maintains the user plane in the source cell, a target AS root key, in other words, a target $K_{CU\text{-}CP}$, is derived by using a derivation parameter corresponding to the CU-CP. For example, the CU-CP identifier, the CU-CP group identifier, or the configured value corresponding to the CU-CP or the CU-CP group is used as the derivation parameter. When the terminal hands over the user plane to the target cell and maintains the control plane in the source cell, a target AS root key, in other words, a target $K_{CU\text{-}UP}$, is derived by using a derivation parameter corresponding to the CU-UP. For example, the CU-UP identifier, the CU-UP group identifier, or the configured value corresponding to the CU-UP or the CU-UP group is used as the derivation parameter. When the terminal hands over both the control plane and the user plane to the target cell, target AS root keys, in other words, a target $K_{CU\text{-}CP}$ and a $K_{CU\text{-}UP}$, are derived by using derivation parameters corresponding to the CU-CP and the CU-UP. Certainly, in this case, the CU-CP and the CU-UP may be integrally considered, and a target AS root key $K_{CU}$ is derived by using the CU identifier, the CU group identifier, the configured value corresponding to the CU or the CU group, or the area identifier.

That is, the method in the foregoing embodiment may be applied to the network architecture in FIG. 9 or FIG. 10. In this case, the RAN node in the foregoing embodiment is a CU node. Correspondingly, the derivation parameter corresponds to the CU node, a CU node group, or an area, and cells at a same CU node or in a same CU node group or area have a same derivation parameter. For example, the derivation parameter may be a CU ID, an identifier of the CU node group, or an identifier of the area. In the network architecture shown in FIG. 10, the CU node may be a CU-UP entity, may be a CU-CP entity, or may be a CU entity including the CU-CP and the CU-UP.

The following provides descriptions by using the network structure shown in FIG. 9 as an example.

Figure 12:
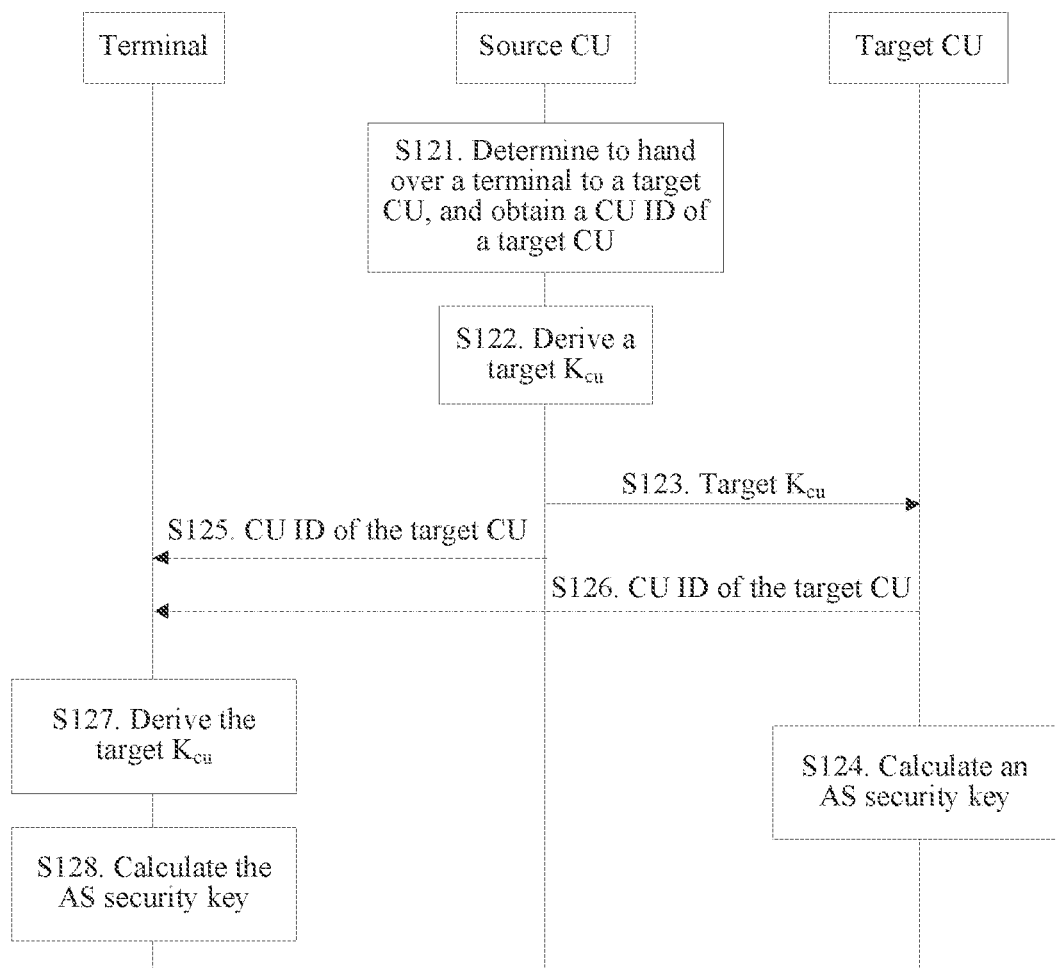
FIG. 12 is a schematic diagram of still another communication security processing method according to an embodiment of this application.

Referring to FIG. 12, FIG. 12 is a schematic diagram of another communication security processing method according to an embodiment of this application. Steps S121 to S128 are similar to the steps S710 to S780 in FIG. 7, and an order of the steps is not limited to the order of the sequence numbers. This embodiment and the embodiment shown in FIG. 7 are applied to different network architectures. This embodiment is applied to the network architecture shown in FIG. 9. Relative to the embodiment shown in FIG. 7, the source eNB and the target eNB are changed into a source CU and a target CU. In addition, a difference from the embodiment shown in FIG. 7 is that the RAN node is a CU node, the derivation parameter is a CU ID, and the AS root key is $K_{CU}$. Certainly, the AS root key may alternatively be an NH. For descriptions of each step, refer to the embodiment shown in FIG. 7, and details are not described herein again. When this embodiment is applied to the network architecture shown in FIG. 10, the RAN node may be a CU node, a CU-UP entity, or a CU-CP entity, and the derivation parameter may be a CU ID, a CU-UP ID, or a CU-CP ID.

Figure 13:
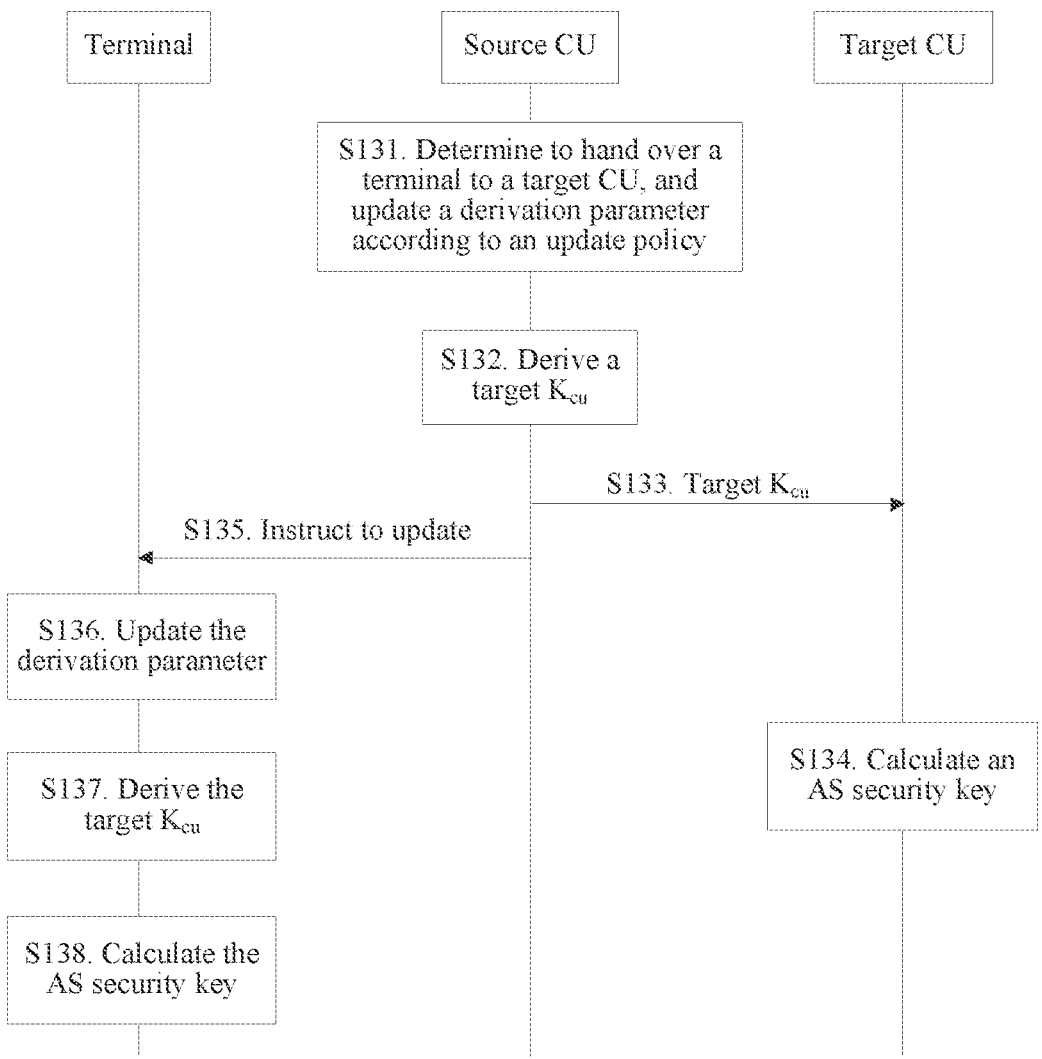
FIG. 13 is a schematic diagram of still another communication security processing method according to an embodiment of this application.

In addition, configuring a same derivation parameter policy in a terminal and on a network side is also applicable to the network structures shown in FIG. 9 and FIG. 10. For example, a same initial value of a derivation parameter and a same update policy are set on the terminal and at a CU node on the network side. When the terminal is handed over between cells at the CU node, the derivation parameter is not updated, and the terminal and the CU node do not need to update an AS security key. When the terminal is handed over between CU nodes, the CU node may instruct the terminal to update the derivation parameter. Referring to FIG. 13, FIG. 13 is a schematic diagram of another communication security processing method according to an embodiment of this application. Steps S131 to S138 are similar to the steps S810 to S880 in FIG. 8, and an order of the steps is not limited to the order of the sequence numbers. This embodiment and the embodiment shown in FIG. 8 are applied to different network architectures. This embodiment is applied to the network architecture shown in FIG. 9. Relative to the embodiment shown in FIG. 8, the source eNB and the target eNB are changed into a source CU and a target CU. In addition, a difference from the embodiment shown in FIG. 8 is that the RAN node is a CU node and the AS root key is $K_{CU}$. Certainly, the AS root key may alternatively be an NH. For descriptions of each step, refer to the embodiment shown in FIG. 8, and details are not described herein again. When this embodiment is applied to the network architecture shown in FIG. 10, the RAN node may be a CU node, a CU-UP entity, or a CU-CP entity, and the derivation parameter may be a CU ID, a CU-UP ID, or a CU-CP ID.

In the communication security processing method provided in the embodiments of this application, cells served by a same RAN node or in a same RAN node group or area have a same derivation parameter. When the source cell and the target cell are located at a same RAN node or in a same RAN node group or area, the terminal and the RAN node do not need to update the AS security key. When the source cell and the target cell are located at different RAN nodes or in different RAN node groups or areas, the terminal and the RAN node update the AS security key. In this way, overheads of key update can be reduced.

Figure 14:
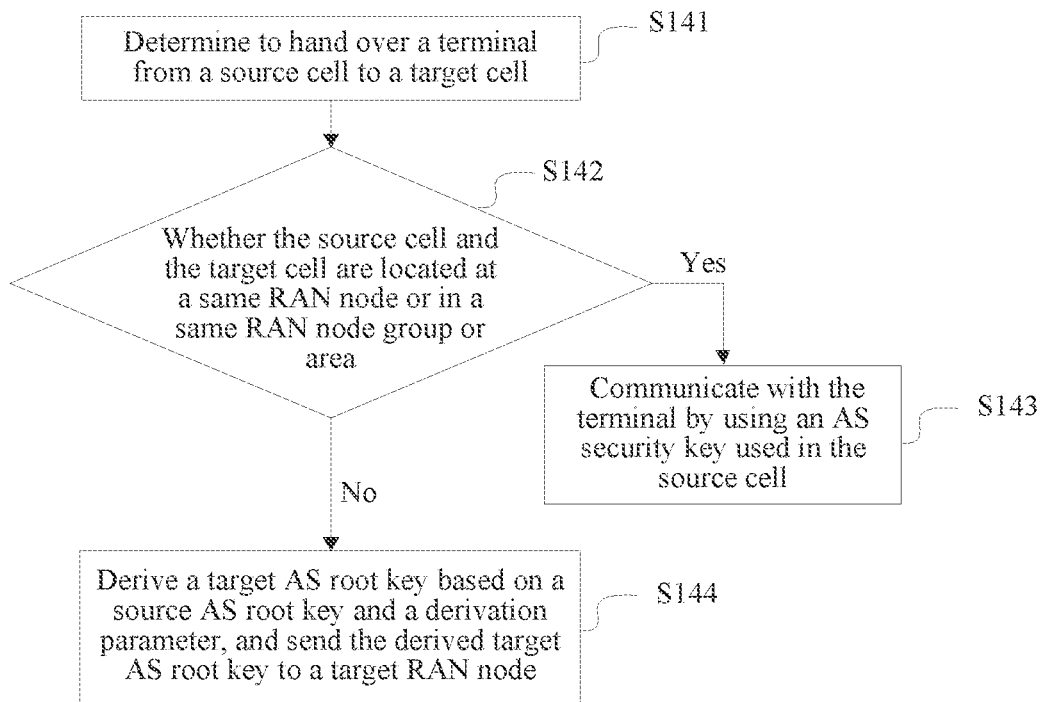
FIG. 14 is a schematic diagram of still another communication security processing method according to an embodiment of this application.

Referring to FIG. 14, FIG. 14 is a schematic diagram of a communication security processing method according to an embodiment of this application. The communication security processing method is performed by a RAN node at which a source cell is located, in other words, a source RAN node. As shown in FIG. 14, the method includes the following steps.

S141: Determine to hand over a terminal from the source cell to a target cell.

For example, the source RAN node may receive a measurement report sent by the terminal, determine, based on the measurement report, that quality of service of the target cell is better, and determine to hand over the terminal from the source cell to the target cell. Alternatively, the terminal determines, through measurement, that quality of service of the target cell is better, determines to be handed over from the source cell to the target cell, and notifies the source RAN node that the terminal determines to be handed over from the source cell to the target cell. The source RAN node determines, based on the notification from the terminal, to hand over the terminal from the source cell to the target cell.

S142: Determine whether the source cell and the target cell are located at a same RAN node or in a same RAN node group or area. When the source cell and the target cell are located at a same RAN node or in a same RAN node group or area, perform step S143, or when the source cell and the target cell are not located at a same RAN node or in a same RAN node group or area, perform step S144.

S143: Communicate with the terminal by using an AS security key used in the source cell.

S144: Derive a target AS root key based on a source AS root key and a derivation parameter, and send the derived target AS root key to a target RAN node.

After receiving the target AS root key sent by a source eNB, a target eNB calculates an AS security key based on the target AS root key, and communicates with the terminal by using the AS security key.

For the derivation parameter, refer to the foregoing descriptions, and details are not described herein again.

When the source cell and the target cell are located at different RAN nodes, the terminal also needs to update the AS security key. In this case, the derivation parameter may be sent by the source RAN node to the terminal, or may be sent by the target RAN node to the terminal. For example, the derivation parameter is sent by the source RAN node to the terminal by using a handover command, or is sent by the target RAN node to the terminal by using a system message. Alternatively, the target RAN node extends an evolved universal terrestrial radio access network cell global identifier (E-UTRAN Cell Global Identifier, ECGI), and adds the derivation parameter to the ECGI, to send the derivation parameter to the terminal by using the ECGI. Alternatively, the derivation parameter is sent by the target RAN node to the terminal when performing AS security algorithm negotiation with the terminal.

Figure 15:
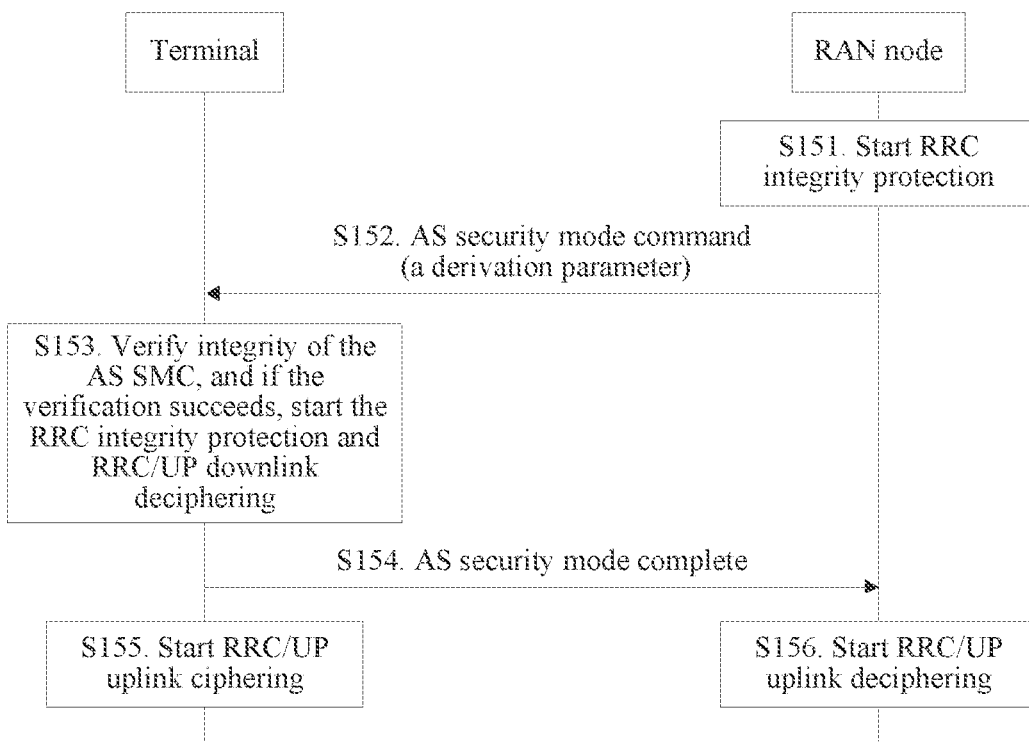
FIG. 15 is a schematic diagram of an AS security algorithm negotiation method according to an embodiment of this application.

Referring to FIG. 15, FIG. 15 is a schematic diagram of an AS security algorithm negotiation method according to an embodiment of this application. The AS security algorithm negotiation is performed between a RAN node and a terminal. As shown in FIG. 15, the AS security algorithm negotiation includes the following steps.

S151: The RAN node starts RRC integrity protection.

S152: The RAN node sends an AS security mode command to the terminal, where the AS security mode command carries an integrity algorithm, a ciphering algorithm, and a message authentication code for integrity (MAC-I). A derivation parameter may be sent to the terminal by using the command, that is, the AS security mode command further carries the derivation parameter. For example, the RAN node is an eNB, and the derivation parameter is an eNB ID. For another example, the RAN node is a CU, and the derivation parameter is a CU ID.

S153: The terminal verifies integrity of the AS security mode command (SMC), and if the verification succeeds, starts the RRC integrity protection and RRC/UP downlink deciphering (Verify AS SMC integrity. If successful, start RRC integrity protection, RRC/UP downlink deciphering).

S154: The terminal sends an AS security mode complete message to the RAN node. The AS security mode complete message carries the MAC-I.

S155: The terminal starts RRC/UP uplink ciphering.

S156: The RAN node starts RRC/UP uplink deciphering.

It may be learned that the terminal can obtain the derivation parameter from the target RAN node by using the foregoing AS security algorithm negotiation process, to derive a target AS root key.

After receiving the derivation parameter, the terminal may derive the target AS root key based on the derivation parameter and then calculate an AS security key.

In addition, when neither the source RAN node nor the target RAN node sends the derivation parameter to the terminal, the terminal may continue using the AS root key used in the source cell, in other words, continue using the AS security key used in the source cell. In addition, the terminal may determine, in another manner, whether to continue using the AS root key used in the source cell. The following provides descriptions with reference to FIG. 16.

Figure 16:
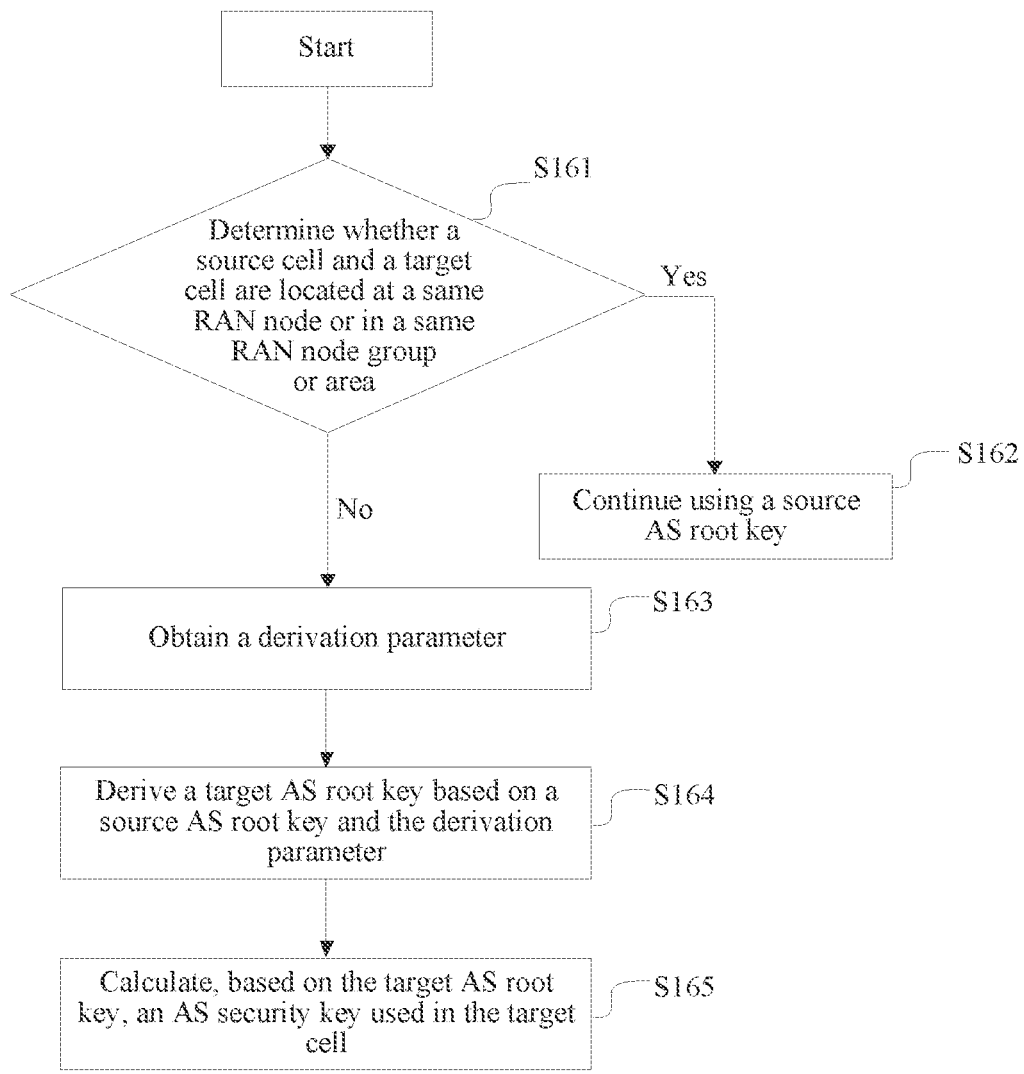
FIG. 16 is a schematic diagram of still another communication security processing method according to an embodiment of this application.

Referring to FIG. 16, FIG. 16 is a schematic diagram of another communication security processing method according to an embodiment of this application. As shown in FIG. 16, the method is applied to processing of AS security when a terminal is handed over from a source cell to a target cell. The method is performed by the terminal and includes the following steps.

S161: Determine whether the source cell and the target cell are located at a same RAN node or in a same RAN node group or area.

When the source cell and the target cell are located at a same RAN node or in a same RAN node group or area, perform step S162, or when the source cell and the target cell are not located at a same RAN node or in a same RAN node group or area, perform steps S163 to S165.

S162: Continue using a source AS root key, in other words, continue using an AS security key used in the source cell.

S163: Obtain a derivation parameter.

S164: Derive a target AS root key based on a source AS root key and the derivation parameter.

S165: Calculate, based on the target AS root key, an AS security key used in the target cell.

It should be noted that the terminal may not perform the foregoing step S161. For example, the terminal receives a handover command sent by a source RAN node, is handed over from the source cell to the target cell based on the handover command, and continues using, in the target cell, an AS root key used in the source cell, in other words, continues using the AS security key used in the source cell. In this case, the terminal does not perceive that the source cell and the target cell are at a same RAN node or in a same RAN node group or area.

For another example, when receiving the derivation parameter, the terminal may consider to derive the target AS root key by directly using the derivation parameter, and does not need to determine whether the source cell and the target cell are located at a same RAN node or in a same RAN node group or area, that is, directly perform the foregoing steps S163 to S165. In this case, the RAN node sends the derivation parameter to the terminal after determining that the source cell and the target cell are located at different RAN nodes or in different RAN node groups or areas. If the RAN node sends the derivation parameter to the terminal regardless of whether the source cell and the target cell are located at a same RAN node or in a same RAN node group or area, the terminal may further determine whether the derivation parameter is the same as a derivation parameter used by the terminal in the source cell. When the derivation parameter is different from the derivation parameter used by the terminal in the source cell, perform the foregoing steps S163 to S165. When the derivation parameter is the same as the derivation parameter used by the terminal in the source cell, perform the foregoing step S162. In this case, the process may be considered as a process of determining whether the source cell and the target cell are located at a same RAN node or in a same RAN node group or area. It should be noted that an objective of the process is to determine whether to update the AS security key, and is not limited to a method for specifically achieving the objective. Several determining methods are listed below.

For example, in the prior art, a source RAN node needs to derive an AS root key during each handover of a terminal, update a corresponding NCC, and send an updated NCC to the terminal by using a handover command, so that the terminal derives an AS root key based on the NCC, and updates an AS security key. In the method provided in this embodiment, when determining that the target cell and the source cell are located at a same RAN node or in a same RAN node group or area, the source RAN node does not derive the AS root key or update the NCC. In this way, the source RAN node may no longer add the NCC to the handover command. When receiving the handover command and finding that the handover command does not carry the NCC, the terminal determines that the target cell and the source cell are located at a same RAN node or in a same RAN node group or area, and continues using the source AS root key, in other words, continues using the AS security key used in the source cell. Alternatively, the source RAN node adds, to a handover command, an NCC not updated. When receiving the handover command and finding that the NCC carried in the handover command is the same as a current NCC of the terminal, the terminal determines that the target cell and the source cell are located at a same RAN node or in a same RAN node group or area, and continues using the source AS root key, in other words, continues using the AS security key used in the source cell. In this case, the foregoing step S161 includes receiving, by the terminal, a handover command sent by the source RAN node, and when the handover command does not include an NCC or an NCC included in the handover command is the same as a current NCC of the terminal, determining, by the terminal, that the source cell and the target cell are located at a same RAN node or in a same RAN node group or area, or else, determining that the source cell and the target cell are located at different RAN nodes or in different RAN node groups or areas.

For another example, the source RAN node sends signaling to the terminal. The signaling is used to instruct the terminal to perform cell handover, but the terminal does not receive the derivation parameter. The terminal may accordingly determine that the source cell and the target cell are located at a same RAN node or in a same RAN node group or area, and continue using the source AS root key, in other words, continue using the AS security key used in the source cell. In this case, the foregoing step S161 includes receiving, by the terminal, signaling sent by the source RAN node, where the signaling is used to instruct the terminal to be handed over from the source cell to the target cell, and when not receiving the derivation parameter, determining, by the terminal, that the source cell and the target cell are located at a same RAN node or in a same RAN node group or area.

For another example, the source RAN node sends signaling to the terminal. The signaling is used to notify the terminal whether the source cell and the target cell are located at a same RAN node or in a same RAN node group or area, or is used to notify the terminal whether to derive the AS root key or update the AS security key. When a value of the signaling is a first value, the terminal derives the AS root key, and when the value of the signaling is a second value, the terminal does not derive the AS root key. In this case, the foregoing step S161 includes receiving, by the terminal, signaling sent by the source RAN node, where the signaling is used to notify the terminal whether the source cell and the target cell are located at a same RAN node or in a same RAN node group or area, or is used to notify the terminal whether to derive the AS root key or update the AS security key, and determining, by the terminal based on the signaling, whether the source cell and the target cell are located at a same RAN node or in a same RAN node group or area.

In step S163, the terminal may obtain the derivation parameter in a plurality of manners. For example, the derivation parameter may be obtained from the source RAN node or may be obtained from the target RAN node. Alternatively, an initial value of the derivation parameter and an update policy may be locally preset, and when the RAN node changes, the derivation parameter is obtained through updating. When the terminal obtains the derivation parameter from the source RAN node, the derivation parameter may be carried in a handover command sent by the source RAN node to the terminal in a handover process. Certainly, the derivation parameter may alternatively be carried in another message sent by the source RAN node to the terminal, or is directly sent by the source RAN node to the terminal. When the terminal obtains the derivation parameter from the target RAN node, the derivation parameter may be broadcast by the target RAN node to the terminal, for example, may be broadcast to the terminal by using a system message. Alternatively, an ECGI may be extended, and the derivation parameter is carried in the ECGI to be sent to the terminal. Alternatively, when negotiating an AS security algorithm with the terminal, the target RAN node sends the derivation parameter to the terminal by using an AS security mode command. Certainly, the target RAN node may alternatively send the derivation parameter to the terminal by using another message, or the target RAN node directly sends the derivation parameter to the terminal.

In addition, a same initial value of the derivation parameter and a same update policy as those of a network side may be set on the terminal. When the terminal is handed over from the source cell to the target cell, and the source cell and the target cell are located at different RAN nodes or in different RAN node groups or areas, the source RAN node may instruct the terminal to update the derivation parameter. After updating the derivation parameter, the terminal derives the target AS root key by using an updated derivation parameter. The foregoing step S163 includes the following steps, including receiving, by the terminal, a notification message sent by the RAN node at which the source cell is located, where the notification message is used to instruct the terminal to update the derivation parameter, updating, by the terminal, the derivation parameter based on the notification message and by using a same update policy as that of a network side, where an initial value of the derivation parameter and the update policy are set on the terminal, and obtaining, by the terminal, an updated derivation parameter.

For example, a counter may be set on the terminal and on a RAN side, for example, at each RAN node on the RAN side, and a same initial value and update step of the counter are set. When finding that the terminal is to be handed over to another RAN node, the RAN node at which the source cell is located instructs the terminal to update a value of the counter. In addition, the RAN node at which the source cell is located also updates a value of the counter as the derivation parameter to derive the target AS root key, and sends the derivation parameter to the RAN node at which the target cell is located, so that the RAN node at which the target cell is located to calculate the AS security key.

In step S164, the terminal may derive the target AS root key by using a key derivation function (KDF). For example the target AS root key=KDF (the source AS root key, the derivation parameter)=HMAC-SHA-256 (the source AS root key, the derivation parameter). The key derivation function is applied to the system shown in FIG. 6, and an example in which the derivation parameter is an eNB ID is used. A target AS root key KeNB*=KDF (a source KeNB, the eNB ID)=HMAC-SHA-256 (the source KeNB, the eNB ID). The key derivation function is applied to the system shown in FIG. 9 or FIG. 10, and an example in which the derivation parameter is a CU ID is used. A target AS root key $K_{CU}$*=KDF (a source $K_{CU}$, the CU ID)=HMAC-SHA-256 (the source $K_{CU}$, the CU ID).

The KDF is an abbreviation of an HmacSha 256 algorithm, is a hash message authentication method, may be considered as a method combining an HMAC algorithm and an SHA256 algorithm, and is an existing algorithm. Improvement in this embodiment is that an input parameter of the function is changed. Therefore, the algorithm is not described herein. In addition, the derivation parameter may further be applied to another function for deriving an AS root key, and the derivation function is not limited in this embodiment.

In step S165, the AS security key used by the terminal in the target cell may also be calculated by using the KDF. For example, Krrcenc/Krrcint/Kupenc/Kupint=KDF (the target AS root key, an algorithm type distinguisher, an algorithm identifier)=HMAC-SHA-256 (the target AS root key, the algorithm type distinguisher, the algorithm identifier), in other words, Krrcenc/Krrcint/Kupenc/Kupint=KDF (the target AS root key, algorithm type distinguisher, Alg_ID)= HMAC-SHA-256 (the target AS root key, algorithm type distinguisher, Alg_ID).

It should be noted that in each embodiment of this application, the KDF may be used to derive the AS root key and calculate the AS security key. In addition, the RAN node and the terminal may both use the method.

In addition, it should be noted that the cell in the embodiments of this application may refer to an area covered by a signal transmitted by a wireless node. The wireless node may include, for example, an antenna, a remote radio head (RRH), a transmission reception point (TRP), an access point, a transmission point (TP), a RAN node, or a base station. The terminal may uniquely identify, by using a cell identifier broadcast by the wireless node, the area. The cell identifier has different levels, and may be a physical layer identifier (for example, a PCI), a reference signal (for example, a reference signal used for channel measurement or a reference signal used for beam measurement), a cell global identification (CGI), or the like. A plurality of cells may be formed when the wireless node broadcasts cell identifiers at a plurality of frequencies. In this case, a cell is an area covered by a signal transmitted by the wireless node at a frequency. When the terminal is handed over between cells of different frequencies at a same RAN node or in a same RAN node group or area, the method provided in the foregoing embodiment is also applicable. In this case, the cell in the foregoing embodiment is a cell corresponding to a particular frequency.

Steps of network elements in the methods disclosed in the foregoing embodiments may be respectively performed by apparatuses on the corresponding network elements. A corresponding apparatus has a corresponding unit configured to perform a step performed by the apparatus.

Figure 17:
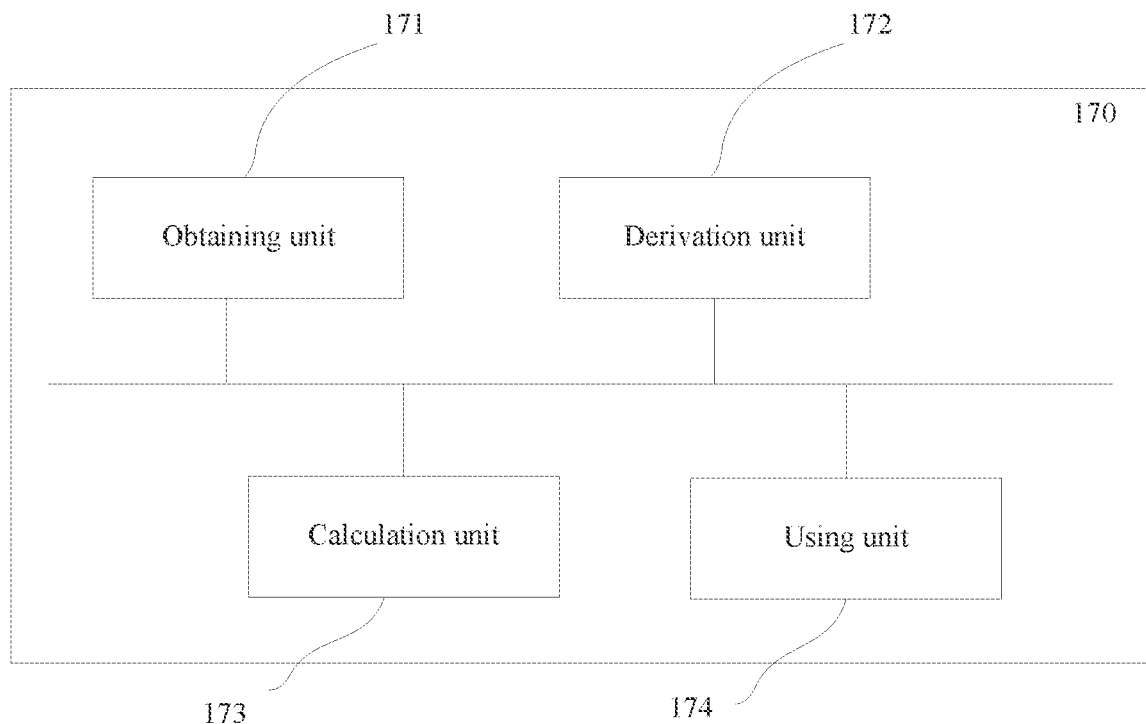
FIG. 17 is a schematic diagram of a communication security processing apparatus according to an embodiment of this application.

Referring to FIG. 17, FIG. 17 is a schematic structural diagram of a communication security processing apparatus according to an embodiment of this application. The apparatus is located in a terminal and is configured to perform some or all operations performed by the terminal in the foregoing implementation. As shown in FIG. 17, the apparatus 170 includes an obtaining unit 171, a derivation unit 172, and a calculation unit 173. The obtaining unit 171 is configured to obtain a derivation parameter when the terminal is handed over from a source cell to a target cell. The derivation unit 172 is configured to derive a target AS root key based on a source AS root key and the derivation parameter. The calculation unit 173 is configured to calculate, based on the target AS root key, an AS security key used in the target cell. The source cell and the target cell are located at different RAN nodes or in different RAN node groups or areas. Descriptions such as obtaining and content of the derivation parameter are equivalent to those in the foregoing embodiments, and details are not described herein again.

In addition, the apparatus 170 may further include a using unit 174, configured to communicate with a target RAN node by using the AS security key calculated by the calculation unit 173. In addition, the using unit 174 is further configured to, when the source cell and the target cell are located at a same RAN node or in a same RAN node group or area, continue using an AS security key used in the source cell.

Figure 18:
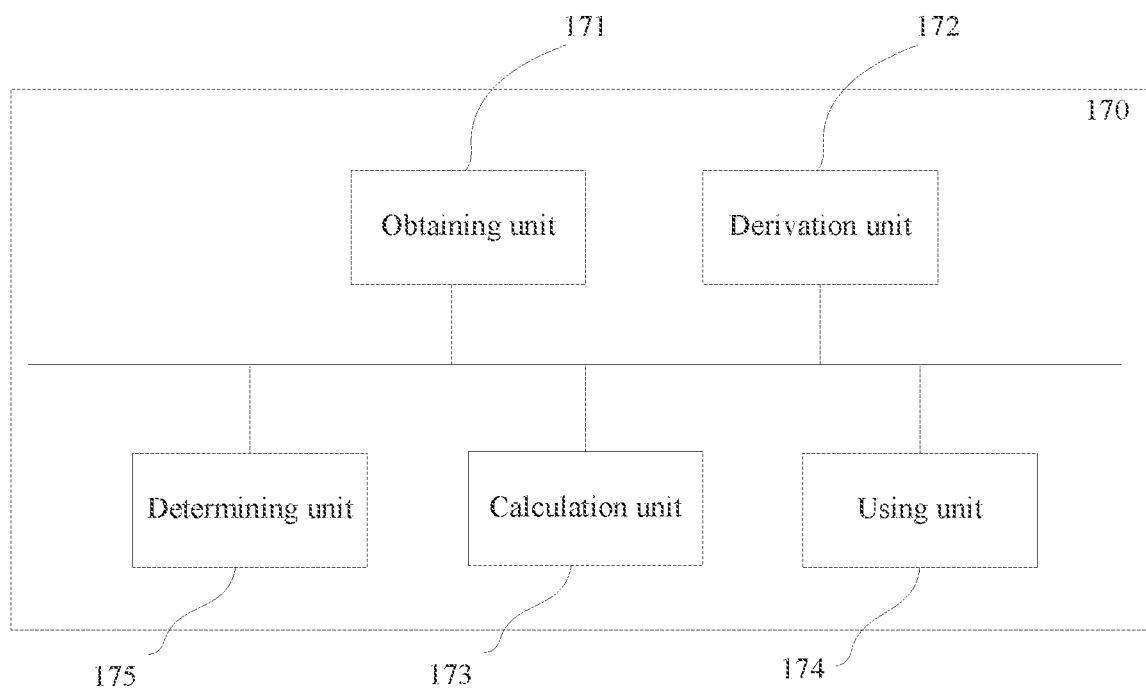
FIG. 18 is a schematic diagram of another communication security processing apparatus according to an embodiment of this application.

Optionally, referring to FIG. 18, the apparatus 170 may further include a determining unit 175, configured to determine whether the source cell and the target cell are located at a same RAN node or in a same RAN node group or area.

The foregoing units may be separately disposed processing elements, or may be integrated into a chip in the terminal for implementation. In addition, the units may be stored in a memory of the terminal in a form of program code. The program code is invoked by a processing element of the terminal to perform functions of the foregoing units. In addition, the units may be integrated together or may be individually implemented. The processing element herein may be a central processing unit (CPU), an application-specific integrated circuit (ASIC), or one or more integrated circuits, for example, one or more microprocessors (digital signal processor, DSP) or one or more field programmable gate arrays (FPGA), that are configured to perform the foregoing method.

Figure 19:
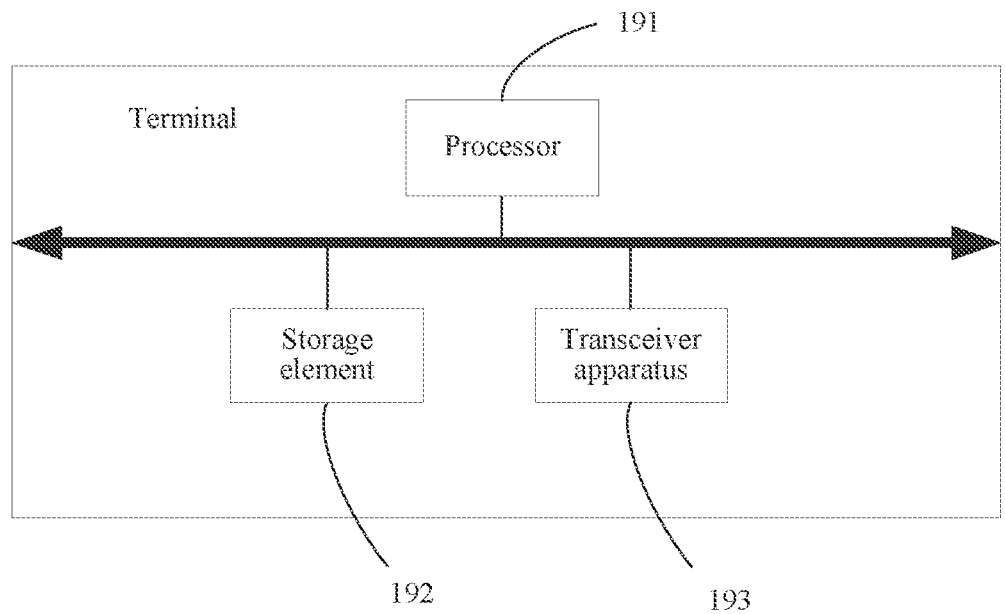
FIG. 19 is a schematic diagram of still another communication security processing apparatus according to an embodiment of this application.

For example, referring to FIG. 19, FIG. 19 is a schematic structural diagram of a communication security processing apparatus according to an embodiment of this application. The apparatus is located in a terminal. As shown in FIG. 19, the apparatus includes a processor 191, a storage element 192, and a transceiver apparatus 193. The transceiver apparatus 193 may be connected to an antenna. In a downlink direction, the transceiver apparatus 193 receives, by using the antenna, information sent by a RAN node, and sends the information to the processor 191 for processing. In an uplink direction, the processor 191 processes data of the terminal, and sends the data to the RAN node by using the transceiver apparatus 193.

The storage element 192 is configured to store a program configured to implement the foregoing method embodiments or the units in the embodiment shown in FIG. 17 or FIG. 18. The processor 191 invokes the program to perform operations in the foregoing method embodiments, to implement the units shown in FIG. 17 or FIG. 18.

In addition, some or all of the foregoing units may be embedded on a chip of the terminal in a form of a field programmable gate array (FPGA) for implementation. In addition, the units may be separately implemented or may be integrated together.

The processor herein may be a CPU, an ASIC, or one or more integrated circuits, for example, one or more DSPs or one or more FPGAs, that are configured to implement the foregoing method. The storage element may be a storage apparatus or may be a general term of a plurality of storage elements.

In addition, a plurality of interfaces may be disposed on the processor, and are separately configured to connect to a peripheral device or an interface circuit connected to a peripheral device, for example, are configured to connect to an interface of a display screen, an interface of a camera, or an interface of an audio processing element.

The foregoing apparatus may be applied to the network shown in FIG. 9 or FIG. 10. Content and obtaining of the derivation parameter when the apparatus is applied to the network are equivalent to the foregoing descriptions, and details are not described herein again.

Figure 20:
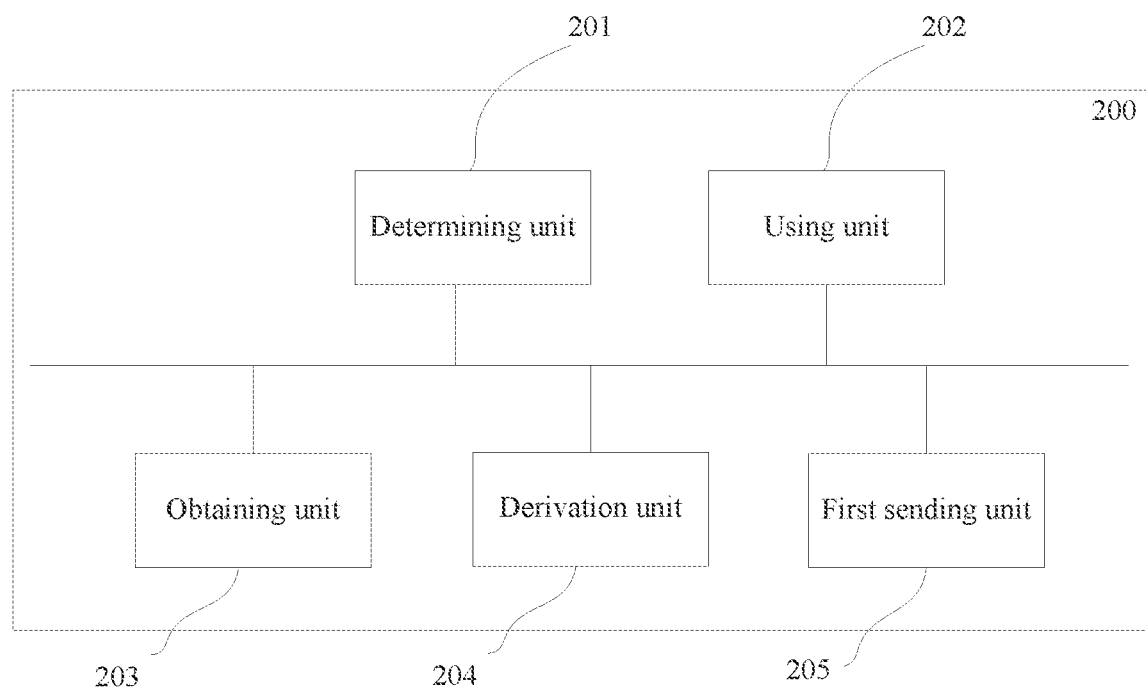
FIG. 20 is a schematic diagram of still another communication security processing apparatus according to an embodiment of this application.

Referring to FIG. 20, FIG. 20 is a schematic structural diagram of a communication security processing apparatus according to an embodiment of this application. The apparatus is located at a RAN node and is configured to perform some or all operations performed by the source RAN node in the foregoing implementation. As shown in FIG. 20, the apparatus 200 includes a determining unit 201 and a using unit 202. The determining unit 201 is configured to determine whether a source cell and a target cell are located at a same RAN node or in a same RAN node group or area. The using unit 202 is configured to, when the source cell and the target cell are located at a same RAN node or in a same RAN node group or area, continue using a source AS root key, in other words, continue using an AS security key used in the source cell.

In addition, the apparatus may further include an obtaining unit 203, a derivation unit 204, and a first sending unit 205. The obtaining unit 203 is configured to obtain a derivation parameter when the source cell and the target cell are located at different RAN nodes or in different RAN node groups or areas. The derivation unit 204 is configured to derive a target AS root key based on a source AS root key and the derivation parameter. The first sending unit 205 is configured to send the target AS root key to a target RAN node, to help the target RAN node to calculate an AS security key. Descriptions such as obtaining and content of the derivation parameter are equivalent to those in the foregoing embodiments, and details are not described herein again.

Figure 21:
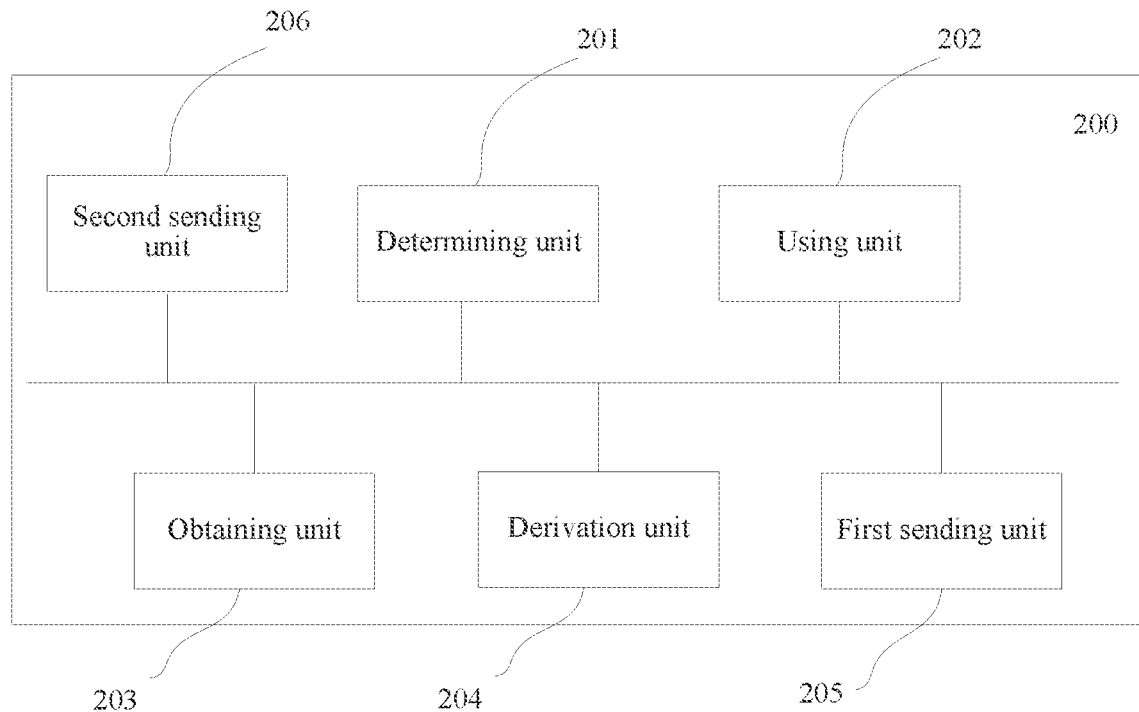
FIG. 21 is a schematic diagram of still another communication security processing apparatus according to an embodiment of this application.

Optionally, as shown in FIG. 21, when the derivation parameter is sent by the source RAN node to the terminal, the apparatus 200 may further include a second sending unit 206, configured to send the derivation parameter to the terminal.

In addition, when the apparatus is applied to the network structure shown in FIG. 9 or FIG. 10, the RAN node is a CU node.

The foregoing units may be separately disposed processing elements, or may be integrated into a chip of the RAN node for implementation. In addition, the units may be stored in a memory of the RAN node in a form of program code. The program code is invoked by a processing element of the RAN node to perform functions of the foregoing units. In addition, the units may be integrated together or may be individually implemented. The processing element herein may be a CPU, an ASIC, or one or more integrated circuits, for example, one or more DSPs or one or more FPGAs, that are configured to implement the foregoing method.

In addition, the first sending unit 205 may send the target AS root key to the target RAN node by using an interface, for example, an X2 interface, between the source RAN node and the target RAN node. When there is no direct connection between the source RAN node and the target RAN node, the first sending unit 205 may send the target AS root key to the target RAN node by using a CN device. The second sending unit 206 may send the derivation parameter to the terminal by using an interface, for example, an air interface, between the source RAN node and the terminal. In a specific implementation, the second sending unit 206 may send the derivation parameter to the terminal by using a radio frequency apparatus and an antenna.

Figure 22:
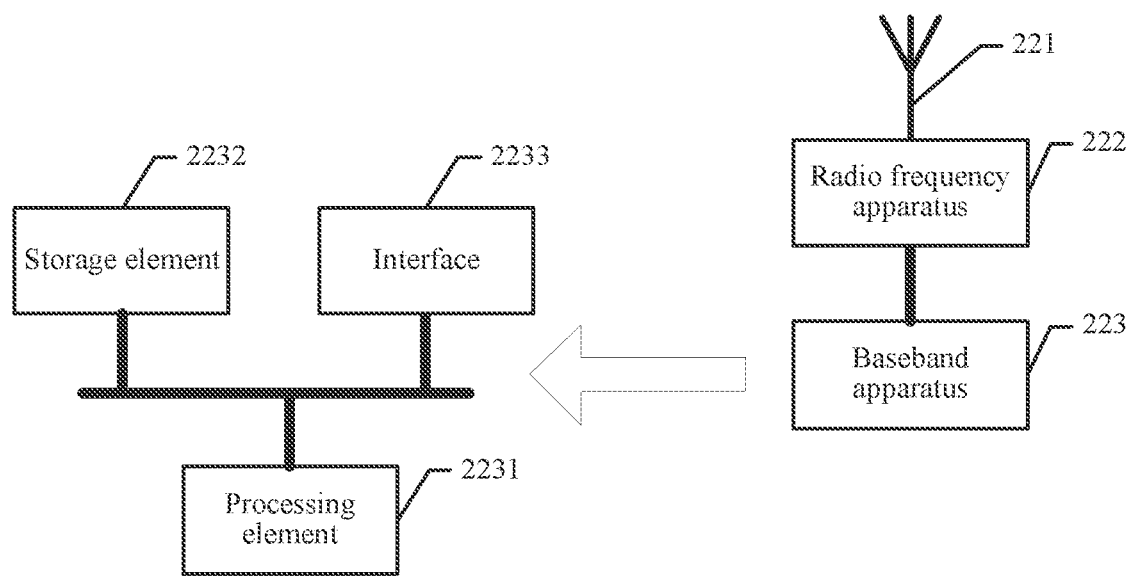
FIG. 22 is a schematic diagram of still another communication security processing apparatus according to an embodiment of this application.

For example, referring to FIG. 22, FIG. 22 is a schematic structural diagram of a RAN device according to an embodiment of this application. As shown in FIG. 22, the RAN device includes an antenna 221, a radio frequency apparatus 222, and a baseband apparatus 223. The antenna 221 is connected to the radio frequency apparatus 222. In an uplink direction, the radio frequency apparatus 222 receives, by using the antenna 221, information sent by the terminal, and sends, to the baseband apparatus 223 for processing, the information sent by the terminal. In a downlink direction, the baseband apparatus 223 processes information of the terminal, and sends the information to the radio frequency apparatus 222. The radio frequency apparatus 222 processes the information of the terminal and sends the information to the terminal by using the antenna 221.

The foregoing communication security processing apparatus may be located in the baseband apparatus 223, and the baseband apparatus 223 includes a processing element 2231 and a storage element 2232. The baseband apparatus 223 may include, for example, at least one baseband plate. A plurality of chips are disposed on the baseband plate. As shown in FIG. 22, one of the plurality of chips is, for example, the processing element 2231, and is connected to the storage element 2232, to invoke a program in the storage element 2232 to perform operations of the source RAN node in the foregoing method embodiment. The baseband apparatus 223 may further include an interface 2233, configured to exchange information with the radio frequency apparatus 222. The interface is, for example, a common public radio interface (CPRI).

The determining unit 201 may be implemented by using one chip of the baseband apparatus 223. Alternatively, a function of the determining unit 201 is stored in the storage element of the baseband apparatus 223 in a form of a program, and is scheduled by using a processing element of the baseband apparatus 223 to implement the function of the determining unit 201. An implementation of another unit, for example, the using unit 202, is the same as that of the determining unit 201. The another unit may be implemented by using another chip of the baseband apparatus 223, or may be integrated together with the determining unit 201 and implemented by using the one chip of the baseband apparatus 223. Some or all of these units may be integrated into at least one chip. Alternatively, some or all of these units may be stored in the storage element of the baseband apparatus 223 in a form of a program and scheduled by a processing element of the baseband apparatus 223 for implementation. Certainly, some units may be implemented through chip integration, and some units may be implemented by using a program. This is not limited in this application.

The processing element herein may be a processor, or may be a general term of a plurality of processing elements. For example, the processing element may be a CPU, an ASIC, or one or more integrated circuits, for example, one or more DSPs or one or more FPGAs, that are configured to implement the foregoing method. The storage element may be a memory or may be a general term of a plurality of storage elements.

A person of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or a compact disc.

What is claimed is:

1. A method, comprising:
   determining, by a centralized unit (CU) node of a radio access network (RAN) node, to hand over a terminal from a source cell to a target cell, wherein the RAN node comprises the CU node and at least two distributed unit (DU) nodes, the CU node is connected to the at least two DU nodes of the RAN node, the CU node comprises a CU control plane (CU-CP) and a CU user plane (CU-UP), and the source cell and the target cell are served by different DU nodes;
   determining, by the CU node, whether both the source cell and the target cell are located at the CU node;
   when both the source cell and the target cell are located at the CU node,
      using, by the CU node in communication of the CU node with the terminal in the target cell, an access stratum (AS) root key that is used in the source cell; and
      sending, by the CU node, a handover command to the terminal without including a derivation parameter in the handover command to instruct the terminal to retain the AS root key used in the source cell after handing over from the source cell to the target cell; and
   when the source cell and the target cell are not located at a same CU node, sending, by the CU node to the terminal, a handover command including the derivation parameter to instruct the terminal to use a target AS root key based on the derivation parameter; and
   wherein the derivation parameter is a parameter used to derive an AS root key, and the derivation parameter comprises a first parameter and a second parameter, wherein the first parameter comprises an identifier of the CU-CP which is a configured value corresponding to the CU-CP, and the second parameter comprises an identifier of the CU-UP which is a configured value corresponding to the CU-UP.

2. The method according to claim 1, wherein a packet data convergence protocol (PDCP) layer and a protocol layer above the PDCP layer are deployed in the CU node, and a radio link control (RLC) layer, a media access control (MAC) layer and a protocol layer below are deployed in the at least two DU nodes.

3. An apparatus, comprising:
   a non-transitory computer-readable storage medium storing instructions; and
   one or more processors coupled to the storage medium and configured to execute the instructions to:
      determine to hand over a terminal from a source cell to a target cell;
      determine whether the source cell and the target cell are located at a same centralized unit (CU) node of the apparatus;
      when both the source cell and the target cell are located at the CU node,
         use, in communication of the apparatus with terminal in the target cell, an access stratum (AS) root key that is used in the source cell, wherein the apparatus comprises the CU node and at least two distributed unit (DU) nodes, the CU node is connected to the at least two DU nodes of the apparatus, the CU node comprises a CU control plane (CU-CP) and a CU user plane (CU-UP), and the source cell and the target cell are served by different DU nodes; and
         send a handover command to the terminal, in case that the source cell and the target cell are located at the same CU node, without including a derivation parameter in the handover command to instruct the terminal to retain the AS root key used in the source cell after handing over from the source cell to the target cell; and
      when the source cell and the target cell are not located at a same CU node, send, to the terminal, a handover command including the derivation parameter to instruct the terminal to use a target AS root key based on the derivation parameter; and
   wherein the derivation parameter is a parameter used to derive an AS root key, and the derivation parameter comprises a first parameter and a second parameter, wherein the first parameter comprises an identifier of the CU-CP which is a configured value corresponding to the CU-CP, and the second parameter comprises an identifier of the CU-UP which is a configured value corresponding to the CU-UP.

4. The apparatus according to claim 3, wherein a packet data convergence protocol (PDCP) layer and a protocol layer above the PDCP layer are deployed in the CU node, and a radio link control (RLC) layer, a media access control (MAC) layer and a protocol layer below are deployed in the at least two DU nodes.

* * * * *